US006889275B2

(12) United States Patent
Vandecappelle et al.

(10) Patent No.: US 6,889,275 B2
(45) Date of Patent: May 3, 2005

(54) RESOURCE INTERCONNECTION PATTERNS IN A CUSTOMIZED MEMORY ORGANIZATION CONTEXT

(75) Inventors: Arnout Vandecappelle, Schilde (BE); Tycho van Meeuwen, Eindhoven (NL); Allert van Zelst, Woerden (NL); Francky Catthoor, Temse (BE)

(73) Assignee: Interuniversitaire Micro-Elektronica Centrum (IMEC vzw), Leuven (BE)

(*) Notice: Subject to any disclaimer, the term of this patent is extended or adjusted under 35 U.S.C. 154(b) by 406 days.

(21) Appl. No.: 10/128,629

(22) Filed: Apr. 22, 2002

(65) Prior Publication Data

US 2003/0041128 A1 Feb. 27, 2003

Related U.S. Application Data

(60) Provisional application No. 60/285,822, filed on Apr. 23, 2001.

(51) Int. Cl.[7] .................. G06F 15/16; G06F 15/177; G06F 13/00
(52) U.S. Cl. ............... 710/107; 709/220; 710/300
(58) Field of Search ................. 710/100, 300, 710/107, 316; 716/2, 5, 16, 17; 709/214, 220; 711/148, 149, 100; 370/257

(56) References Cited

U.S. PATENT DOCUMENTS

| | | | | |
|---|---|---|---|---|
| 5,448,496 A | * | 9/1995 | Butts et al. | 716/16 |
| 5,612,891 A | * | 3/1997 | Butts et al. | 716/16 |
| 6,343,313 B1 | * | 1/2002 | Salesky et al. | 709/204 |
| 6,421,809 B1 | * | 7/2002 | Wuytack et al. | 716/2 |

OTHER PUBLICATIONS

"Performance modeling of the interconnect structure of a three-dimensional integrated RISC processor/cache system" by Kuhn S.A.; Kleiner, M.B.; Ramm, P.; Weber, W. (abstract only) Publication Date: Nov. 1996*

F. Catthoor et al., 'Custom Memory Management Methodology', Kluwer Ac. Publ., 1998, Table of Contents and pp. 193–300.

* cited by examiner

Primary Examiner—Gopal C. Ray
(74) Attorney, Agent, or Firm—Knobbe, Martens, Olson & Bear, LLP

(57) ABSTRACT

A system and method are provided that include determining optimum memory organization in an electronic device, wherein further determined are optimum resource interconnection patterns. One aspect of the system and method includes determining resource, e.g., memories and data paths, interconnection patterns of complex bus structures with switches using system-level information about the data-transfer conflicts. The quantity of memories within an electronic device, the size of the memories and the interconnection between the memories, including the interconnection of the memories with one or more data paths, defines a memory organization of an electronic device. Another aspect of the system and method relates to selecting an optimized memory organization, including selecting an optimized interconnection pattern between the memories and between the memories and the data paths.

28 Claims, 24 Drawing Sheets

300

400

900

1000

1700

RESOURCE INTERCONNECTION PATTERNS IN A CUSTOMIZED MEMORY ORGANIZATION CONTEXT

RELATED APPLICATION

This application claims the benefit under 35 U.S.C. § 119(e) of U.S. Provisional Application No. 60/285,822, filed Apr. 23, 2001 and titled "MEMORY INTERCONNECTION EXPLORATION PROBLEM IN A CUSTOMIZED MEMORY ORGANIZATION CONTEXT," which is hereby incorporated by reference in its entirety.

BACKGROUND OF THE INVENTION

1. Field of the Invention

The invention relates to systems and methods for memory organization in an electronic device. More particularly, the invention relates to a system and method for determining optimum resource, e.g., memories and data paths, interconnection patterns in an essentially digital device.

2. Description of the Related Technology

The memory interconnection exploration problem in a customized memory organization context was identified in F. Catthoor et al., 'Custom Memory Management Methodology', Kluwer Ac. Publ., 1998, which is hereby incorporated by reference in its entirety.

In an essentially digital device, several resources, such as data paths and memories, are recognized. Such resources may be connected for communication purposes. Such communication allows the execution of the functionality of the digital device. The connections of such resources are referred to as buses in the technology. The quantity of memories within an electronic device, the size of the memories and the interconnection between the memories, including the interconnection of the memories with one or more data paths, defines a memory organization of an electronic device.

Techniques exist to minimize the number of interconnection lines and multiplexers required for connecting the logic gates in data path synthesis. Using these data path synthesis techniques for global memory interconnection implies that the memory interconnection is determined after detailed scheduling. Indeed, the scheduling stage sees the memories as pre-allocated resources which can be accessed in parallel, without taking into account possibilities for time-multiplexing the buses, and may therefore create more conflicts between the data transfers than is strictly necessary to meet the real-time constraints. Further said prior art techniques assume that everything runs at the same clock speed and that all transfers take less than one cycle, which is not the case for memory accessing.

At the level of data path synthesis, no distinction is made between the local buses from register files to functional units, and the global buses between the memories and the data path. There is a huge difference in cost, however, for the global buses. The time-multiplexing overhead is almost negligible compared to the gain of sharing two buses, while in data path synthesis buses are only shared if they have either source or destination in common with each other.

In data path synthesis, the interconnections are situated between sources and destinations. The sources and destinations are known because the full schedule is known. At the global level on the other hand, the data path is treated as a black box, and some of the memories may be multi-ported, so the exact source or destination information for a transfer cannot be known yet. Furthermore, when dealing with a distributed hierarchical background memory organization, memory-to-memory copies are enabled to avoid these copy transfers to be routed via the data path. This makes it practically impossible to assume a source-destination interconnection model for the memory buses.

In the data path context, both buses and multiplexers are equally weighted optimization targets. Moreover, previous approaches do not sufficiently exploit the different bit widths of the signals traveling over the shared bus.

Most of the existing approaches in data transfer binding assume a simple, linear bus structure, but for the global buses there is more freedom. For example, a bus can be split in two by inserting a switch on it. This concept has been utilized already in the technology but the problem regarding the other requirements on memory interconnect addressed herein have not previously been solved.

SUMMARY OF CERTAIN INVENTIVE ASPECTS

One aspect of the present invention provides a method for determining resource, e.g., memories and data paths, interconnection patterns, including complex bus structures with switches, before the detailed scheduling is done, hence using system-level information about the data-transfer conflicts, enabling the exploitation of the time-multiplexing, on condition that an analysis of the minimum required memory bandwidth is available, and taking into account the gain of sharing buses compared to the cost of multiplexing overhead, hence without equally weighting said optimization targets and finally exploiting the different bit widths of the signals traveling over the shared bus. Another aspect of the present invention relates to selecting an optimized memory organization, including selecting an optimized interconnection pattern between the memories and between the memories and the data paths.

An additional aspect of the present invention provides a method of determining an optimized resource interconnection pattern within an essentially digital device. The method comprises determining an optimized labeling of a transfer conflict graph that is determined at least from a plurality of scheduling intervals, and selecting an optimized interconnection pattern that satisfies at least the constraints depicted by the optimized labeling of the transfer conflict graph.

A further aspect of the present invention provides an essentially digital device comprising resources, and an optimized interconnection pattern between the resources, the optimized interconnection pattern comprising buses, each of the buses interconnecting a portion of the resources. The essentially digital device is represented by a representation describing the functionality of the digital device, the representation comprising transfers that are defined by a source resource and a destination resource, and scheduling intervals for the transfers. The essentially digital device is characterized by the optimized interconnection pattern such that at least one bus facilitates a plurality of transfers with non-overlapping transfer scheduling intervals.

An additional aspect of the present invention provides an essentially digital device comprising resources, and an optimized interconnection pattern between the resources, the optimized interconnection pattern comprising buses, each of the buses interconnecting a portion of the resources. The essentially digital device is represented by a representation describing the functionality of the digital device, the representation comprising transfers defined by a source resource and a destination resource, and scheduling intervals for the transfers. The digital device is characterized by the optimized interconnection pattern such that at least one bus facilitates a plurality of transfers with non-overlapping transfer scheduling intervals or temporarily facilitates a plurality of transfers with partially overlapping scheduling intervals.

Another aspect of the present invention provides an essentially digital device comprising at least five resources, and an interconnection pattern between the resources. The interconnection pattern comprising a plurality of buses, each of the buses interconnecting a portion of the resources, the interconnection pattern having a plurality of switches.

A further aspect of the present invention provides a method of manufacturing an essentially digital device. The method comprises determining at least from a plurality of scheduling intervals an optimized labeling of a transfer conflict graph, and selecting an optimized interconnection pattern that satisfies at least the constraints depicted by the optimized labeling of the transfer conflict graph.

An additional aspect of the present invention provides a method of determining an optimized resource interconnection pattern for representing the functionality of an essentially digital device. The method comprises determining an optimized labeling of a transfer conflict graph that is determined at least from scheduling intervals, and selecting an optimized interconnection pattern that satisfies at least the constraints depicted by the optimized labeling of the transfer conflict graph.

A further aspect of the present invention provides a design system for designing an essentially digital device. The system comprises a means for generating a representation describing the functionality of the essentially digital device, the representation comprising transfers and scheduling intervals for the transfers. The system further comprises a means for determining an optimized labeling of a transfer conflict graph that is determined from the scheduling intervals. The system additionally comprises a means for selecting an optimized interconnection pattern that satisfies at least the constraints depicted by the optimized labeling of the transfer conflict graph.

DETAILED DESCRIPTION OF CERTAIN INVENTIVE ASPECTS

Figure 1:
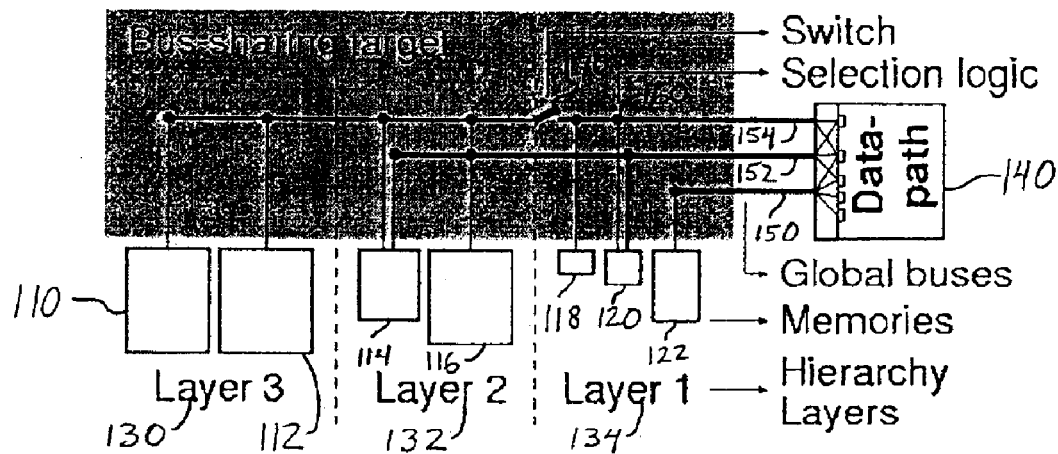
FIG. 1 is a diagram of one embodiment of a target architecture for bus sharing to add bus selection logic for reducing the number of global buses.

The following detailed description of certain embodiments presents various descriptions of specific embodiments of the present invention. However, the present invention can be embodied in a multitude of different ways as defined and covered by the claims. In this description, reference is made to the drawings wherein like parts are designated with like numerals throughout.

In an essentially digital device, several resources, such as data paths, being electric circuits computing output signals based on input signals, and memories, being electric circuits used for storing signals, are recognized. Such resources may be connected if communication between the resources is needed, for example, communication in the form of transmitting signals from one resource to another, such signal transmitting aimed at transferring information from one resource to another. Such communication may be needed for the execution of the functionality of the digital device. The connection of such resources are denoted as buses, each being a bundle of at least one interconnection line, the amount of the bundle typically defined by the bit width of the information being transferred over the bus.

One embodiment of the present invention includes a method and a design system for determining an optimized resource organization of an essentially digital device comprising resources. In this embodiment, the method and design system determine as part of the optimized resource organization, an optimized interconnection pattern between the resources, being part of the optimized resource organization. The method may determine an optimized resource interconnection pattern for an essentially digital device, comprising of resources. The method is capable of exploiting a representation describing the functionality of the digital device, the representation comprising transfers of information, wherein the transfers are defined by their source resource and their destination resource. Further, the representation comprises scheduling intervals for the transfers of information. An aspect of such an embodiment is that the determining of an optimized interconnection pattern is reformulated in a problem of determining an optimized labeling of a so-called transfer conflict graph (TCG).

In one embodiment, an optimized interconnection pattern defines the number of buses and indicates which resources which buses connect. The memory type resources or memories may have at least one port. A port has properties, meaning it is a read port for transferring information out of the memory, or it is a write port enabling storing of information in the memory, or it is a read/write port having both capabilities. A memory may also be a multi-port device having a plurality of ports, each with a certain property. Hence, in addition to indicating which memories are connected to which buses, also indicated is which ports of the memories each bus is connected in the case of multiport memories. In the case of multiple bus-port assignments, the most cost effective one is often selected. Hence, there exists a need for optimization of the bus-port assignment. In one embodiment of the present invention, the determining of an optimized bus-port assignment is reformulated in a problem of determining an optimized labeling of a so-called access conflict graph.

The determination of an interconnection pattern may be performed at system-level, e.g., before behavioral synthesis. Indeed the scheduling of the transfers, meaning stating at which cycle they are performed, is not completed. One embodiment of the method works with scheduling intervals. For the transfers only a multi-cycle interval wherein later the transfer must be scheduled is given.

The determining of an optimized resource interconnection pattern may introduce time-multiplexing of buses, meaning that a bus can be used for at least two transfers if the transfers are performed at a different time instance and in the context of system-level exploration if the transfer scheduling intervals are not overlapping. An optimized interconnection pattern can also define switches within buses, such that a switch divides a bus into two sub-buses.

This methodology of bus sharing allows an interconnect architecture with a minimum amount of buses according to the required parallelism in the system, hence the architecture can be referred to as an optimized parallelism compliant architecture. This parallelism is determined by the maximum amount of data transfers that are expected to occur in the system. To explore different bus-sharing alternatives, the parallelism is modeled in a graph. To find an optimal bus-sharing alternative, cost functions are developed to indicate the cost of a specific solution. Thus, not only is the number of buses minimized, but additionally minimized is the amount of selection logic that is introduced.

Note that in an embodiment of the present invention, the bus sharing may be comprised of the transfer-to-bus assignment, the transfer-to-port assignment and the netlist generation. While performing the bus sharing methods, there are several places where choices are made. Each choice divides the search space into parts. One goal is to look for important choices that are logical to make and at once exclude a big part of the search space. Less important choices are difficult to handle, because their result is generally not easily predictable. The methodology of bus sharing of an embodiment of the present invention is based on postponing these unimportant decisions as long as possible and make these decisions by performing an exhaustive search and by using a cost function. By choosing an appropriate Transfer Conflict Graph (TCG) representation, early decisions can be avoided. So in the graph that is used, the nodes represent transfers to or from memories and the (binary- self- and hyper-) edges are conflicts between these transfers. As described, the memory-to-memory-transfer-conflict-graph (MTCG) can be constructed without making any decisions. That is because the scheduling contains accesses to and from memories. Whereas to construct a TCG in which the nodes represents transfers between memory-ports, then during the TCG construction decisions are made about assigning transfers to specific memory ports. There is an important choice that may be made early. Bus-sharing solutions with a minimum number of buses may be explored. A minimum solution is presented as a correctly labeled MTCG in which the number of different labels equals the minimum number of buses. The minimum number of buses is determined by the hyper-edge with the biggest amount of edge-ends. Other solutions with different labels are often not considered, as they result in a more expensive solution because of the extra buses required. It is a feature of the present invention that non-minimum bus solutions are discarded while determining an interconnect architecture.

The number of memories within an electronic device, the size of the memories and the interconnection between the memories, including the interconnection of the memories with one or more data paths, defines a memory organization of an electronic device. An embodiment of the invention relates to the selection of a memory organization as part of the design of the electronic device. Indeed the actual selection of a memory organization influences the performance of the designed electric device, e.g., the speed at which it can operate, the power consumed during executing its functionality. Hence there is a problem of selecting an optimized memory organization, including the problem of selecting an optimized interconnection pattern between the memories and between the memories and the data paths.

In an embodiment of the present invention, a method and a design system is presented for determining an optimized resource organization of an essentially digital device comprising resources. The method and design system determines, as part of the optimized resource organization, an optimized interconnection pattern between the resources being part of the optimized resource organization. The resources are, for example, data paths and memories.

The method is capable of determining an optimized resource interconnection pattern for an essentially digital device, comprising certain resources. The method exploits a representation describing the functionality of the digital device, the representation comprising transfers of information. The transfers are defined by their source resource and their destination resource. Further, the representation comprises scheduling intervals for the transfers of information. These generally do not correspond to a final scheduling and only provide constraints. If not, previous stages are imposing any additional constraints then the ASAP-ALAP intervals imposed by the memory access graph may be imposed. Note that in an alternative embodiment a digital device is described by the data access instructions on basic groups, being groups of scalar signals and scheduling intervals of said data access instructions. For the digital device, the memories are selected and the assignment of the basic groups to the basic memories is performed. One can derive from the data access instruction scheduling intervals and transfer scheduling intervals.

One embodiment includes the determination of an optimized interconnection pattern that is reformulated in a problem of determining an optimized labeling of what is referred to herein as a transfer conflict graph. In a transfer conflict graph the nodes represent the transfers. Edges between the nodes indicate that there is a conflict between the transfers, meaning that the transfers, represented by the connected nodes, having overlapping scheduling intervals, hence they can not be performed over the same bus. Once the optimized labeling is established, an optimized interconnection pattern is selected, satisfying at least the constraints depicted by the optimized transfer conflict graph labeling.

Of the various embodiments of the present invention, one or more may be implemented with computer software using one or more of the many available computer programming languages. For example, the methods described herein may be written in a programming language such as C, C++, BASIC, Visual BASIC, Ada, Pascal, Java, HTML, and Fortran and run under any of the various well-known operating systems. C, C++, BASIC, Visual BASIC, Ada, Pascal, Java, HTML, and Fortran are industry standard programming languages for which many commercial compilers can be used to create executable code. The methods herein may be used in connection with various operating systems, for example, such as: UNIX, LINUX, Disk Operating System (DOS), OS/2, PalmOS, VX Works, and any of the various versions of the Windows operating system. The software-implemented methods and processes may be comprised of various modules. As can be appreciated by one of ordinary skill in the technology, each of the modules may comprise various subroutines, procedures, definitional statements, and macros. Each of the modules are typically separately compiled and linked into a single executable program. Therefore, the following description of each of the modules is used for convenience to describe the functionality of the various methods and systems. Thus, the processes that are undergone by each of the modules may, for example, be arbitrarily redistributed to one of the other modules, combined together in a single module, or made available in a shareable dynamic link library.

Of the various embodiments of the present invention, one or more may execute on a computer system comprising servers and other computing devices communicating via one of the many available computer network protocols and executing one of the many available operating systems. For example, one such system comprises Hewlett-Packard (HP) servers with 4096 megabytes (MB) of Random Access Memory (RAM), 4 PA-8500 processors running at a processor speed of 440 megahertz (MHz) and executing the HP-UX Unix operating system. Of course, embodiments of the present invention may also be executed on other platforms as well, and may be portable to many other hardware and software platforms, which are within the scope of the present invention.

Figure 13:
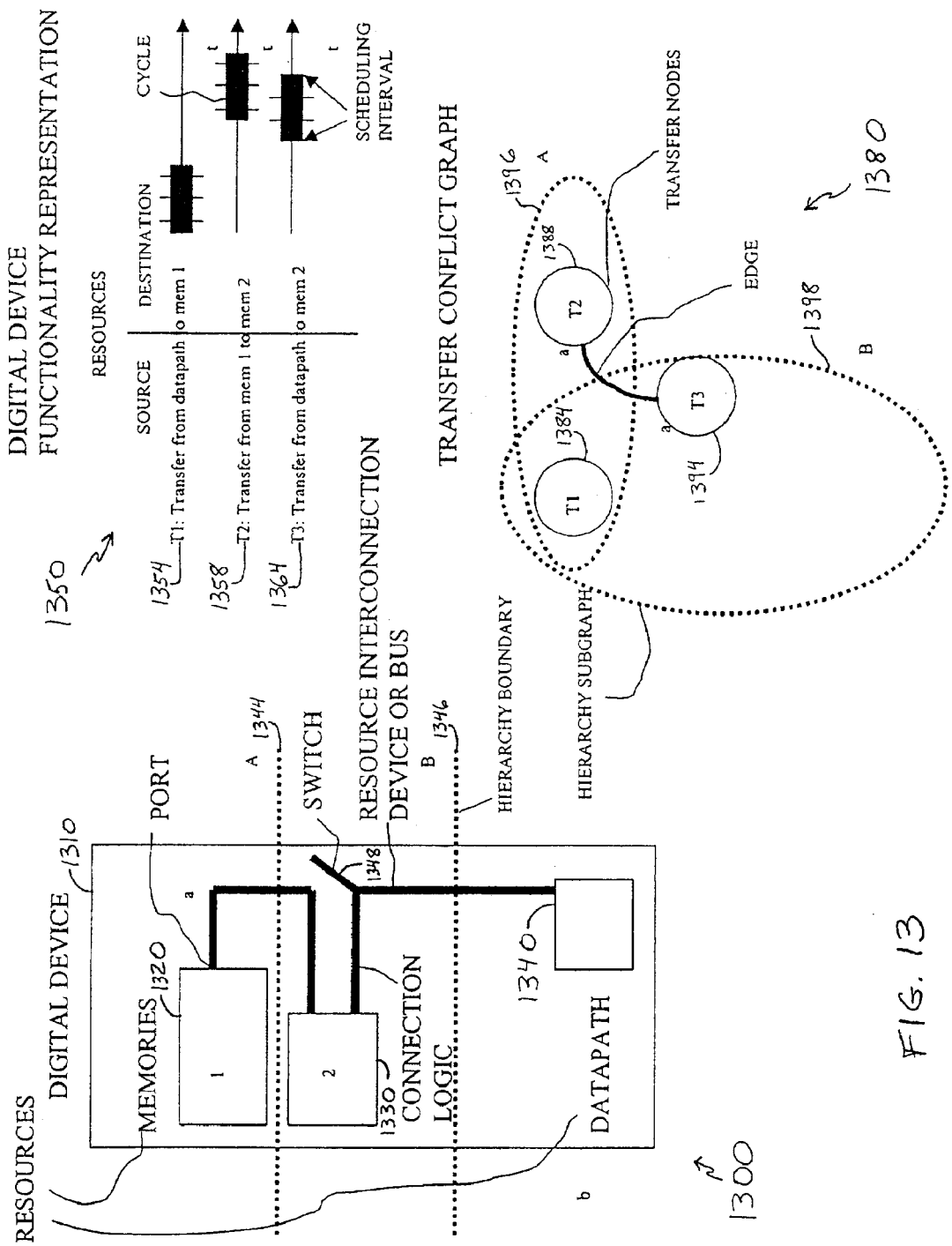
FIG. 13 illustrates the digital device with its resources, a representation in terms of transfer scheduling intervals (substantially larger than the amount of cycles needed by an individual transfer), and the conflict graph representation that is characteristic for the optimization method.

FIG. 13 illustrates the digital device with its resources 1300, a representation in terms of transfer scheduling intervals 1350 (substantially larger than the amount of cycles needed by an individual transfer), and the conflict graph representation 1380 that is characteristic for the optimization method. FIG. 13 shows a digital device 1310 with two memories 1320, 1330, referred to as memory 1 and memory 2, respectively, and a single data path 1340, although other embodiments may be applicable to a multi-resource device with multiple memories and multiple data paths. In the digital device representation, three transfers 1354, 1358, 1364, referred to as T1, T2, and T3, respectively, may be present, defined by the source and destination resource, for instance for T1 1354 the source is the data path 1340 and the destination is memory 1 1320. For each of the transfers, a time interval, defining the scheduling interval, is indicated in which the transfer takes place. Note that the scheduling interval is in essence larger than the number of cycles needed for executing the transfer. Hence the scheduling is not fully fixed this embodiment works at the system-level. The transfer conflict graph 1380 shows the three transfer nodes 1384, 1388, 1394 related to the transfers and the conflicts between the transfers are indicated by an edge, here a single one. Conflicts may be detected by looking for overlapping scheduling intervals. Note that equivalent representations of the digital device exist, such as source code, data access instruction intervals from which the representation depicted here can easily be derived. Within the digital device 1310 a hierarchy between the resources is indicated. Memory 1 1320 is part of a higher memory layer than memory 2 1330. Memory 2 1330 is part of a higher layer than the data path 1340. Hence hierarchy boundaries A 1344 and B 1346 need to be passed while executing the transfers. This is depicted within the transfer conflict graph 1380 by the sets A 1396 and B 1398. The actual design may be performed in a set by set manner, starting with the highest layer. As, in this example, there is no conflict between T1 1384 and T2 1388, one can label the edge of T2 1388 with a single label 'a'. When labeling the second set B 1398, one can re-use that label, understanding that in this embodiment the bus represented by the label 'a' contains a switch 1348. Finally, the bus structure, as shown in the digital device 1310, is capable of being obtained.

On embodiment of an optimized interconnection pattern defines the number of buses and indicates which resources, e.g., memories and data paths, are connected by which buses. The memory type resources or memories have at least one port. A port has properties, meaning, for example, it is a read port for transferring information out of the memory, or it is a write port enabling storing of information in the memory, or it is a read/write port having both capabilities. A memory can be also a multi-port device, meaning that it has a plurality of ports, each with a certain property. Hence, in addition to indicating which memories are connected to which buses, for the case of multi-port memories it is advantageous to indicate to which ports of said memories each bus is connected. In the case of multiple bus-port assignments, the most cost effective one may be selected, which presents the problem of optimization of the bus-port assignment.

In one embodiment of the present invention, the determination of an optimized bus-port assignment is reformulated in a problem of determining an optimized labeling of what is referred to as an access conflict graph. In an access conflict graph the nodes represent said accesses, i.e., as a transfer from or to a memory, hence each transfer defines two accesses. From the scheduling intervals of the transfers, scheduling intervals for the accesses can be defined. Edges between the nodes indicate that there is a conflict between the accesses, meaning that the accesses, represented by the connected nodes, having overlapping scheduling intervals, hence they can not be assigned to the same port. Once said optimized labeling is established, an optimized bus-port assignment may be selected, satisfying at least the constraints depicted by the optimized access conflict graph labeling. The bus-port assignment may be done for each memory separately.

Figure 12:
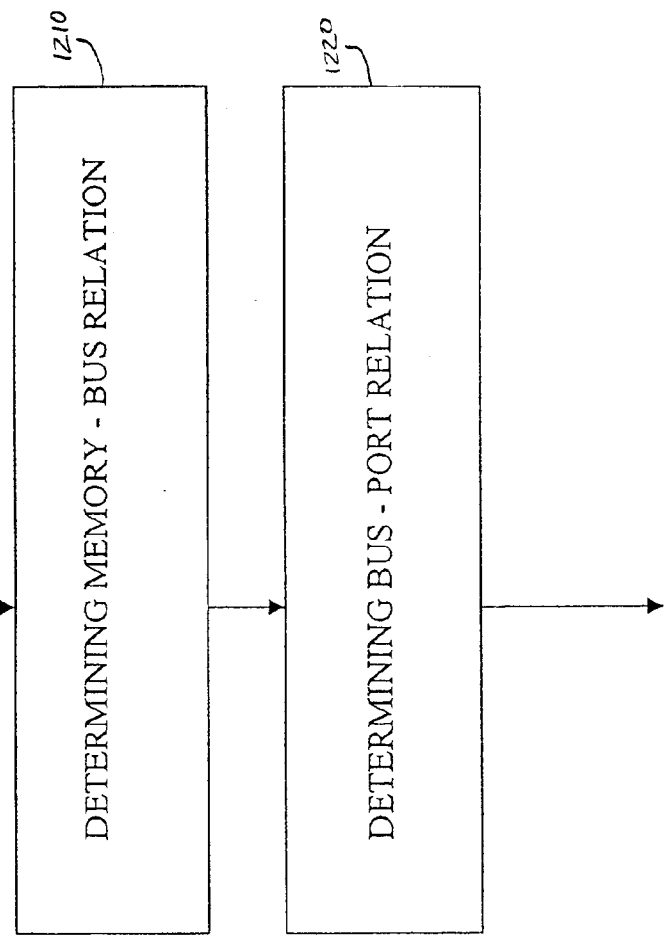
FIG. 12 is a flowchart of one embodiment of a method, starting from a system-level representation, for obtaining an optimized interconnection pattern.

FIG. 12 is a flowchart of one embodiment of a process 1200, starting from a system-level representation, for obtaining an optimized interconnection pattern. The process 1200 starts from a digital device representation at system level, describing the transfers from resources such as memories and data paths and their scheduling intervals is used as input for the process 1200. In one embodiment, the process 1200 may be comprised of two stages. In a stage 1210, which is based on optimized labeling of a transfer conflict graph, a memory-bus relation is determined. In a stage 1220, which is based on optimized labeling of an access conflict graph, a bus-port relation is determined. Both relations may indicate the digital devices optimized interconnection pattern.

Figure 23:
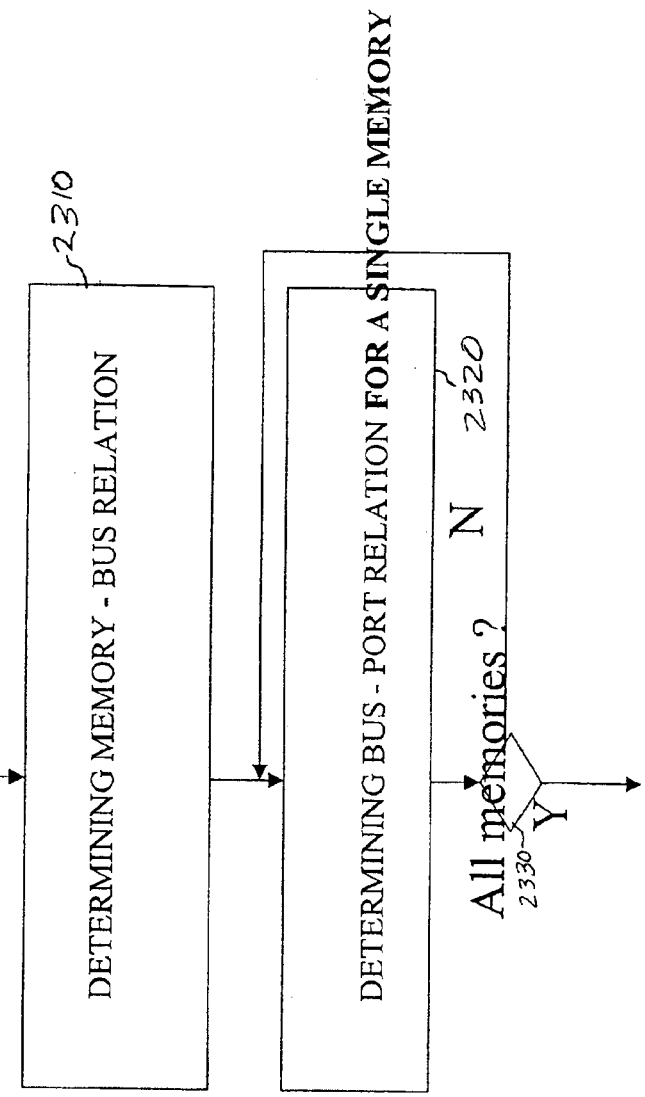
FIG. 23 is a flowchart of an additional embodiment of a method of optimizing the interconnection patterns of essentially digital devices.

FIG. 23 is a flowchart of an additional embodiment of a process 2300 of optimizing the interconnection patterns of essentially digital devices. The process 2300 starts from a digital device representation at a system level, describing the transfers from resources such as memories and data paths and their scheduling intervals which are used as input for the process 2300. In one embodiment, the process 2300 may be comprised of a stage 2310, which is based on optimized labeling of a transfer conflict graph, of determining a memory-bus relation. At a stage 2320, which is based on optimized labeling of an access conflict graph, a bus-port relation is determined for a single memory. Both relations may indicate the digital devices optimized interconnection pattern. At a decision stage 2330, if bus-port relations have not been determined for all the memories, the process 2300 continues back at stage 2320. If at decision stage 2330, bus-port relations have been determined for all the memories, the process 2330 ends having optimized the interconnection patterns for the digital device. At this stage 2330, digital device optimized interconnection patterns, e.g., memory-bus, bus-memory port relations) may be provided.

Figure 24:
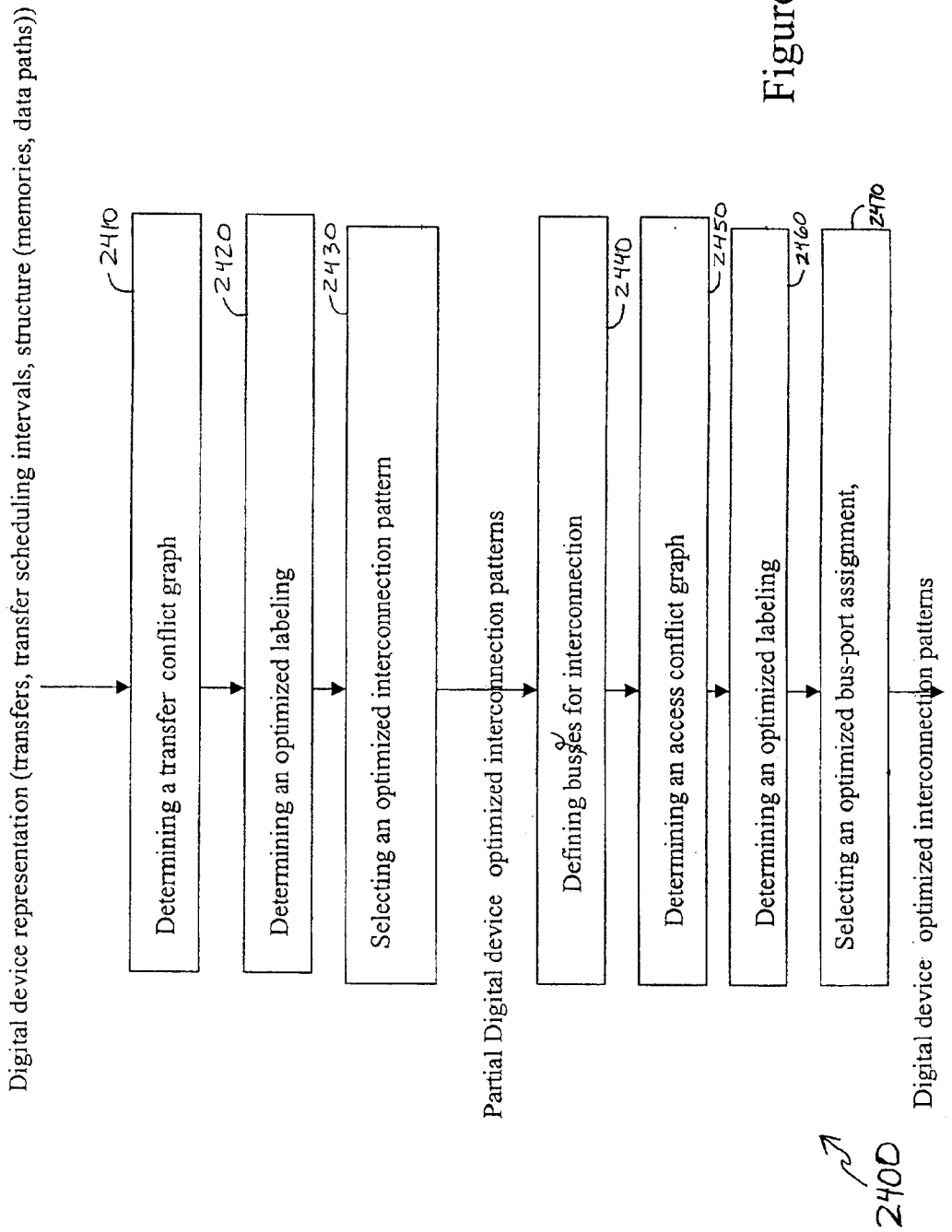
FIG. 24 is a flowchart of a further embodiment of a method of optimizing the interconnection patterns of essentially digital devices

FIG. 24 is a flowchart of a further embodiment of a process 2400 of optimizing the interconnection patterns of essentially digital devices. The process 2400 starts from a digital device representation at a system level, describing the transfers from resources, such as memories and data paths, and their scheduling intervals, which are used as input for the process 2400. In one embodiment, the process 2400 may be comprised of a stage 2410 for determining a transfer conflict graph from the input digital device representation. A stage 2420 for determining an optimized labeling of the transfer conflict graph may also be included. A stage 2430 selects an optimized interconnection pattern, satisfying at least the constraint represented by the optimized transfer conflict graph. At this stage, partial digital devices optimized interconnection patterns or optimized resource interconnection patterns may be provided. The process 2400 further comprises a stage 2440 for defining buses for interconnection of the resources. A stage 2450 may be included for determining an access conflict graph form the representation. The process 2400 further comprises a stage 2460 for determining an optimized labeling of the access conflict graph. A stage 2470 may be included for selecting an optimized bus-port assignment, satisfying at least the constraint represented by the optimized access conflict graph. At this stage 2470, digital device optimized interconnection patterns or optimized resource interconnection patterns may be provided.

Note that the determining of an interconnection pattern may be performed at a system-level, meaning before behavioral synthesis. The scheduling of the transfers, e.g., stating at which cycle they are performed, is not completed. In this embodiment, the process works with scheduling intervals. For the transfers a multi-cycle interval, in which later said transfer must be scheduled, is given.

Hence, one embodiment includes a system-level process for determining an optimized resource interconnection pattern within an essentially digital device, before behavioral synthesis of the digital device, comprised of resources. The essentially digital device may be represented by a representation, comprising transfers and multi-cycle scheduling intervals for the transfers. The process may comprise the stages of determining an optimized labeling of a transfer conflict graph and selecting an optimized interconnection pattern, thus conforming to the transfer conflict graph. Also, the bus-port assignment may be executed at the system-level, thus before behavioral synthesis, and may be based on multi-cycle intervals of accesses.

By selecting an optimized interconnection pattern is meant the selection of a number of buses, being resource interconnection means and deciding for each of the buses which resources (at least two) they connect.

In one example of an interconnect pattern definition approach, one could define one bus for one transfer, but that is not optimal in sense of area and power consumption. The determining of an optimized resource interconnection pattern aims at introducing time-multiplexing of buses, meaning that a bus can be used for at least two transfers if the transfers are performed at a different time instance and in the context of system-level exploration if the transfer scheduling intervals are not overlapping.

An optimized interconnection pattern can also define switches within buses, being such that each switch divides a bus into two sub-buses. When the switch is open, simultaneously two transfers on said bus, more in particular one transfer on one sub-bus, the other on the other sub-bus, can take place. At system-level, an open switch of a bus facilitates two transfers with partly-overlapping scheduling intervals via said bus, one on each sub-bus. As a switch can be open or closed, a switch may enable a bus to temporarily facilitate two transfers with partially overlapping transfer scheduling intervals. The use, of a switch may be for transfers which are in conflict in time but not in space, e.g., the transfers may come from different source resources and go to different destination resources, and the sub-buses, also denoted bus segments, may connect the appropriate resources.

A system-level, e.g., exploiting only background memory bandwidth input, methodology, which may reduce the number of interconnections by sharing transfers to or from different memories over the same bus, e.g., time-multiplexed buses, and particularly applicable to large designs, i.e., systems with at least five memories or with at least two hierarchy layers or combinations thereof, based on transfer conflict graph labeling, is presented. A large design also implies a complicated system with, for example, at least five memories and/or two hierarchy layers with at least one multi-port memory. The devices may be comprised of at least five memories and/or two hierarchy layers and optionally with at least one multi-port memory. Further devices are contemplated with at least two switches in the interconnection pattern or at least two switches within the same bus.

A more detailed description of various embodiments of the present invention, illustrated with examples, is provided below. The following definitions may be helpful in clarifying terms used within the description herein.

Tri-state buffer: logic element that can be used to connect memory ports to buses. By using these buffers, the memory ports can be connected and disconnected from the bus, because it is possible to switch the output of these buffers to a high-impedance state. A buffer is assumed as a smallest building block to connect ports to buses. The number of needed buffers is counted to express the cost of a connect architecture.

Memory hierarchy layer: based on bandwidth and high-level storage cost, memories may be partitioned over several memory hierarchy layers. Applications may become more power efficient and speed up, because big memories are placed on high layers, e.g., background, and are typically accessed infrequently. Frequently used data is copied to smaller memories in higher layers, e.g., more foreground.

Data transfer: the replacement of data from one resource to the other resource, e.g., memories. A transfer can be seen at different levels of granularity. This can mean that a replacement of many separated data-bytes is called one transfer.

Basic group: groups of scalars that are considered at once, as opposed to individual scalars. They form a partitioning of the data that is stored in background memory.

Intra-layer transfer: data transfer that takes place between two resources, which are situated in the same memory hierarchy layer.

Layer-boundary transfer: data transfer that crosses a layer boundary between two memory hierarchy layers.

Multi-boundary transfer: data transfer that crosses more than one layer boundary.

Access: read or write action that takes place on both sides of a transfer at the resources.

Abstract Storage Cycle: An abstract storage cycle can be interpreted as 'the time required to do one memory-transfer'. This abstraction makes it easier to determine whether two transfers are in conflict. Moreover, it is a multi-cycle time interval in which the transfer can take place, although the real moment is typically not known, as the whole scheduling is not fixed yet.

Conflicts: transfers can be 'in conflict', i.e., they happen at the substantially the same moment. For example, a conflict may exist when the time interval in which the transfers are scheduled overlap.

Hyper-edges: connections in a graph that do connect a not empty set of nodes. A hyper-edge can be seen as a central 'core' and 'edge-ends' that connect to the different nodes.

Hyper-nodes: nodes that are connected by hyper-edges.

Hyper-graph: an undirected graph with hyper-edges and hyper-nodes.

Labeling a hyper-graph: assigning values to edge-ends of a hyper-graph. Those values are properties for the things an adjacent node, e.g., to the edge-end, represents.

Conflict graph: a hyper-graph in which hyper-edges indicate conflicts between the nodes it connects.

If nodes model transfers it is referred to as a 'transfer conflict graph'; if nodes model accesses it is referred to as an 'access conflict graph'.

Port: a port is the connection between an interconnect network and the rest of the world. This can be, for example, a data port to a memory, an address port, etc. A port has a certain bit width. It can either send or receive one word of data during one abstract storage cycle.

Bus: a bus is a data connection from a sending port to a receiver port. A bus can be connected to several ports to allow for multiple different transfers to use the bus. However they generally may not use the bus at the same time. The bit width of a bus is that which is sufficient for the maximum bit width of all data that is to be transferred over the bus.

Data Path: logic and local interconnect, focusing on data processing. A data path has ports capable of being connected to memories.

Switch: logic that can make a connection between two or more buses, so that data transfers can take place between buses.

Connection point: a virtual resource with a read and a write port. A transfer can be split into parts. Those parts may be 'connected' again by passing by a connection point. Normally a transfer is assigned to one bus, after splitting into two parts, both parts can be assigned to two different buses. This implies that data transfer between the two buses is possible, e.g., if a switch is present. Therefore, a connection point models the presence of switches.

Transfer to bus assignment: the decision that tells which transfers are going to use which buses in specific conflict-situations.

Transfer to port assignment: the decision that tells which transfers are going to use which (memory) ports in specific conflict situations. This decision is made when a memory has more than one port, e.g., multiport memories.

Bus-sharing: name for the methodology that time-multiplexes transfers over buses.

Netlist: architecture of interconnections between ports. It can contain, for example, buses, switches, or selection logic.

Cost function: a function applied on a netlist to determine the cost of the netlist. Different types of cost can be considered, e.g., power and area.

Pareto curve: a diagram with axes indicating different costs. A point in this diagram indicates a solution that may be found by a cost function. A curve can be drawn passing the less-costly solutions. The points in the space with more costly solutions are generally not interesting, as they may be worse in all types of cost and can be replaced by a preferred solution.

For data dominated applications, e.g., multimedia, using a more customized, hierarchical and distributed memory organization can significantly alleviate power consumption and memory bandwidth bottlenecks. However, this potentially entails very complex memory interconnections, sometimes resulting in a large routing overhead.

Data-intensive applications, like multimedia, e.g., image and video coding, 3D graphics, mobile telephony, and the like, and network configuration management, e.g., ATM and LAN/WAN components, are becoming a significant part of the embedded system market. For these applications, a large part of the power consumption is due to the storage and transfer of large amounts of data, and the memory bandwidth is a bottleneck for performance. These bottlenecks can be removed by a more customized memory architecture. The use of distributed memory organizations enables parallelism in the data transfer, thus alleviating memory access bottlenecks. Correspondingly, a customized memory hierarchy allows reducing the power requirements by exploiting data reuse and transfer locality opportunities, which are present in the optimized algorithm.

However, a potential showstopper for custom memory organizations is the data communication network that connects the memories with each other and with the data path. Because of the distributed nature of the memory organization, a high number of buses are allocated to route the data and to avoid bus contention. These memory interconnections can create a big area overhead when not carefully implemented. Moreover, they can create potential bottlenecks during the physical design, due to, e.g., place and route complexity, extra metal layers, and longer global wires with larger delays.

By exploiting time-multiplexing opportunities between the (long) memory buses, this overhead can be significantly reduced. Also, the subsequent physical design stage benefits from the decreased complexity. One embodiment of the present invention includes a model and optimization approach for memory bus time multiplexing, which enables exploration of the interconnection architecture at the system level. Experiments performed on real-life applications show that even for very distributed memory organizations, the interconnection complexity can be significantly reduced to a cost-efficient, manageable level.

Nevertheless, at the system level there are still significant opportunities for low cost implementations of the interconnect netlist of these more customized memory organizations, by time-multiplexing the long memory buses. Indeed, in case there is no conflict between two transfers, they can be routed over the same global bus. This can remove some of the global buses and replace them with a cheaper local connection between the memory and the shared bus.

For a given custom memory architecture, many alternatives exist for time-multiplexing memory buses. Each alternative results in a certain overhead in terms of multiplexers and steering logic, and some will lead to violations of the real-time constraints when the application is scheduled in a later stage. It is therefore possible to explore the alternatives, in order to make the area and power trade-offs involved, while still meeting the timing constraints. To efficiently explore the possibilities for bus sharing, an accurate model of the conflicts between transfers is considered. This model may work at the system level, before the actual physical design stage is started. An embodiment of the present invention includes an appropriate model in terms of a transfer conflict graph and an appropriate approach of optimizing within such model.

Currently, designers in the memory technology connect up memories to a single, high-speed and overloaded global bus. Customization of the memory architecture is in this case limited to very specific tricks, e.g., interleaving the accesses to two memories. In addition, a dedicated slave memory for one specific functional unit may be used, with a dedicated bus between the two. Such approaches fail to take advantage of a memory organization that is customized already at the system level.

An embodiment of the present invention includes a model of the freedom that exists at the system level for time-multiplexing the memory interconnections. This model can be used in an approach to systematically explore the search space and trade off the number of buses against bus selection logic overhead. Experiments on real-life applications show that the memory interconnections become a problem with a very distributed memory architecture. Exploration on these applications also shows that it is possible to significantly reduce the complexity of the global netlist. As a result, many of the memory buses can be efficiently shared between different memories, with minimal additional multiplexing overhead.

To reduce the complexity of the memory interconnections, they can be time-multiplexed, which is referred to as bus sharing. One goal of the bus-sharing decision is to find the most cost-efficient interconnection architecture, which still provides enough memory bandwidth to meet the real-time constraints.

Without bus-sharing, there would be one global bus for every memory port. The bus-sharing time-multiplexes data transfers from different memories over a single global bus. Reducing the number of global memory buses with bus sharing has at least the following advantages. For interconnection with off-chip memories, reducing the number of buses also reduces the number of I/O pins required on the chip, which is the most important component of the packaging and integration cost. On-chip global interconnections are either routed in non-active routing area, or in the top metal layers; reducing the number of buses can therefore also reduce the required area and especially the required number of metal layers, which contributes directly to the production cost.

The reduction of global wiring comes at the cost of additional multiplexer and control overhead to select the correct bus for every memory access. This overhead implies extra area for the logic, extra local routing between the multiplexers and the memory ports, and a few extra global control wires to steer the multiplexers. However, the reduced interconnection complexity still typically pays off, as the global bus lines have more impact than the local lines and logic. Also, the number of extra global control lines is smaller than the bus-sharing savings.

Figure 14:
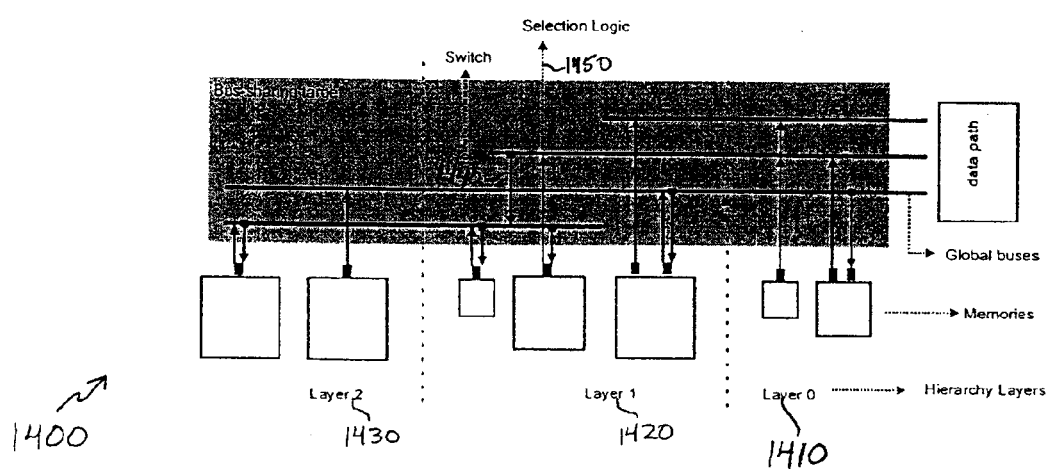
FIG. 14 is a diagram of one embodiment of the target architecture with memories being located in at least three layers.

Alternatively, the problem can be stated as finding an optimal, or at least beneficial, interconnect netlist for the interconnections between memory-ports and between memory-ports and the data path, in such a way that the transfers have an available path from source to sink, in given conflict situations. A netlist is good or optimal if it occupies less area in terms of wires, connecting-logic and I/O paths and if it is power-efficient. Extra attention is paid to minimize the amount of buses at the boundaries of different memory-hierarchy-layers. Those places are extra costly because of the needed I/O paths, e.g., the connection from off-chip to on-chip memory. FIG. 14 is a diagram of one embodiment of the target architecture 1400 with memories being located in at least three layers 1410, 1420, 1430. The architecture 1400 has several resources, e.g., data paths and memories, connected by a plurality of buses. The memories can be organized in several memory hierarchies. In between the buses, switches 1440 may be found. The memories each have at least one port. The ports can connect to at least one of the buses via selection logic 1450. The global buses may be accessed via bus selection logic, which selects one of the buses for each transfer.

FIG. 1 is a diagram of one embodiment of a target architecture for bus sharing 100 to add bus selection logic for reducing the number of global buses. In this embodiment, the memories 110, 112, 114, 446, 118, 120, 122 are distributed over several memory hierarchy layers 130, 132, 134. They are connected with each other and to the data path 140 via global buses 150, 152, 154. The buses 150, 152, 154 may be used for transfers both from a memory 110, 112, 114, 446, 118, 120, 122 to the data path 140, and between two memory hierarchy layers 130, 132, 134. The global buses 150, 152, 154 may be accessed via bus selection logic 160, which is capable of selecting one of the buses 150, 152, 154 for each transfer. The bus selection logic 160 can be customized for the application in later physical design stages, where its particular implementation is selected, e.g., multiplexer, tri-state driver, crossbar, or more complex logic performing arbitration, etc. This decision can depend on a number of parameters, e.g., the number of bit-lines or switching activity.

The topology of FIG. 1 is referred to as linear, as opposed to the random topology, where connections are point-to- (multi)point. The random topology offers more freedom than a linear one, but is more complex to model. However, in the context of a hierarchical memory organization, the random topology can be effectively approximated by introducing switches in the global buses. A switch 170, as shown in FIG. 1, can split a bus into two or more parts, so that multiple transfers can take place in parallel over the bus when the switch 170 is open. Selecting a circuit-level implementation of this abstract switch concept may be left to the physical design stages.

One embodiment may include a bus-sharing approach, which may comprise three stages. One stage of this embodiment is the Transfer Conflict Graph (TCG), which represents the minimum parallelism in transfers for real-time operation. This information can be generated from previous stages in our design methodology, or can be generated from the intermediary data in other background memory management approaches. In another stage, this TCG is labeled to determine which buses are to be used for which transfers. A further stage is instantiating the abstract labeling representation into a netlist of interconnections and multiplexing logic. Based on this netlist, the cost of this implementation can be evaluated, using a component library containing the necessary parameters for the target hardware technology.

The possibilities for time-multiplexing the memory buses may be limited by the parallelism required in the memory architecture to achieve real-time operation. Therefore, a formalism of this parallelism is required to allow exploration of the valid bus-sharing alternatives. This formalism models the real-time constraints, but also allows the freedom of choosing a port for each data transfer and for inserting switches in the architecture.

In one embodiment, it is assumed the memory bandwidth requirements have been analyzed at an earlier stage to obtain conflict information between the different transfers in the application. In this embodiment, the storage bandwidth optimization approach is used, but other system-level techniques that arrive at conflicts between data-transfers can be used as well. Full ordering is not imposed, which is beneficial at the system level to remove the global buses.

Figure 2:
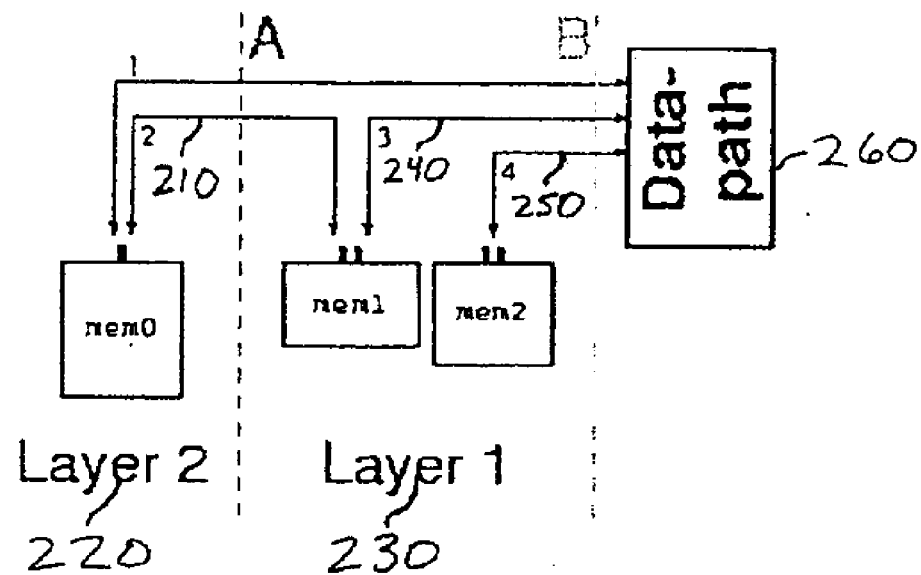
FIG. 2 is a diagram of one embodiment of a memory architecture illustrating identification of the transfers through the hierarchy and boundaries between the layers.
Figure 3:
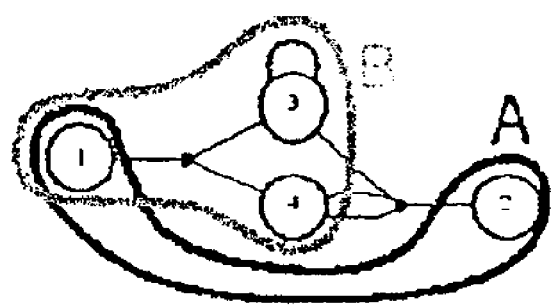
FIG. 3 illustrates an example of a Transfer Conflict Graph (TCG) for the memory architecture example shown in FIG. 2.

As the representation of this conflict information, a Transfer Conflict Graph (TCG) is used, which contains the conflicts, e.g., edges, between the application's memory transfers, e.g., nodes. FIG. 3 illustrates an example of a Transfer Conflict Graph (TCG) 300 for the memory architecture example shown in FIG. 2. In the TCG example of FIG. 3, nodes represent transfers, edges represent conflicts, black dots represent hyper edges indicating three or more transfers in parallel, and subgraphs indicate hierarchy boundaries.

A transfer may be defined by its source and destination memory or data path, but can be analyzed at different levels of granularity. At the lowest level, the individual memory access is considered as a separate transfer. However, memory accesses can be grouped, up to the maximum level where the communication between two memories is considered as a single transfer. Lower granularity increases the search space complexity, but offers more freedom for combining different transfers over one bus. For example, an access to an array with a narrow bit width, which may be stored in a memory with a larger bit width, can be routed over a narrow bus. The transfers can be analyzed at the level of arrays, which allows full exploitation of different bit widths and unidirectional buses, and is not too complex to explore.

An edge in the TCG represents a conflict between the two transfers it connects. Thus, at a certain point, the two transfers are required in parallel, so they cannot be routed over the same bus. When three or more transfers happen in parallel, this is indicated by a hyper-edge in the conflict graph, as represented by a black dot in FIG. 3. Note that a hyper-edge also implies conflicts between each of the nodes it connects, so other, e.g., binary, edges between these nodes can be left out of the graph. Further, because memories may be multi-ported, a transfer can conflict with itself. In the TCG, this results in loops or hyper-edges that connect to the same node more than once. In FIG. 3, for example, two transfers of type 3 take place in parallel, indicated by a loop, and also one of type 2 and one of type 3, e.g., both accessing the dual-ported memory labeled as mem1, are in parallel with two of type 4, indicated by a hyper-edge which connects to node 4 twice.

With the TCG model, the bus-sharing decision can be represented by labeling the edge-endpoint of the TCG with the bus that is used for it. A labeling is valid if all endpoints of a (hyper)edge have a different label. This allows a formal exploration of the bus-sharing possibilities. With this model, it is possible to achieve a minimal number of global buses, equal to the hyper-edge of the largest degree in the TCG. Moreover, the minimum can be achieved between every two-memory hierarchy. For example, in FIG. 3, the number of buses crossing memory hierarchy boundary A can be reduced to only 1, while two buses are required to cross boundary B. Still, several efficient labeling solutions are possible for a single TCG. These can be evaluated by constructing the resulting interconnection netlists and estimating and comparing their cost.

Figure 4:
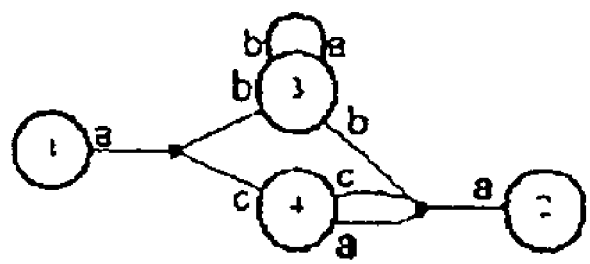
FIG. 4 illustrates an example of a labeled TCG of the TCG shown in FIG. 3, in which three buses are used (labeled in FIG. 4 as 'a', 'b' and 'c').

One rule for labeling the TCG is that the endpoints of a hyper-edge be labeled differently. Indeed, an edge represents a conflict, so the transfers use a different bus at the moment they are in conflict. A single transfer may go over a different bus in different conflict situations, at the cost of extra selection logic. FIG. 4 illustrates an example of a labeled TCG 400 of the TCG 300 shown in FIG. 3, in which three buses are used (labeled in FIG. 4 as 'a', 'b' and 'c').

In one embodiment of the hierarchical memory architecture, not all the global buses need to span the entire hierarchy, e.g., see FIG. 1. Between two memory hierarchy layers, the number of buses can be minimized. This gives rise to a hierarchical approach to the TCG labeling. The TCG is divided in subgraphs, for example, one subgraph for every boundary between memory hierarchy layers. FIG. 3 shows the subgraphs for the two memory hierarchy boundaries in this example. Each subgraph may be labeled one by one, starting with the highest memory hierarchy level. This ensures that the first things to optimize are the most costly connections, with the longest wire lengths and with I/O-pins and off-chip drivers. For example, in FIG. 3, the transfers belonging to subgraph A are labeled, and only one label is required for these, e.g., there is no edge between them.

The TCG labeling allows exploration of sharing possibilities in a simple linear bus architecture, but with a little extension it also supports switches to split a bus in two segments. Because the memory architecture is hierarchical, it is possible that data transfers are in conflict in time, but not in place. For example, transfer 2 210 in FIG. 2, which is a diagram of one embodiment of a memory architecture 200 illustrating identification of the transfers through the hierarchy and boundaries between the layers, goes from memory hierarchy layer 2 220 to layer 1 230, while transfer 3 240 and transfer 4 250 go from layer 1 230 to the data path 260. Therefore, these transfers can use different sections of the same bus. This is possible by inserting a switch between the two sections of the bus. For these global buses, the cost of such a switch is generally negligible compared to the cost of the buses, even taking into account the extra control wire required to steer the switch. In the TCG, two edge-endpoints are allowed to be labeled the same if the nodes they connect to do not belong to the same subgraph. In FIG. 4, for example, transfer 2 belongs to subgraph A, while transfers 3 and 4 belong to subgraph B. Thus, the edge-endpoints at transfer 4 can be labeled with the same bus 'a' as was used for transfer 2. The labels implying a switch are put in bold in the figures.

Even with the minimal number of buses, the TCG can typically be labeled in a number of ways. Still, several labelings may be evaluated to be equally efficient. These may be passed to the netlist construction, where a cost analysis is used to find an optimal alternative.

The labeled TCG is an abstract representation of the bus-sharing decisions. For further synthesis of the application, this representation may be translated to a list of connections between the memory ports and the buses. This also implies that a port is chosen for each transfer to or from a multi-port memory. Based on this interconnection netlist, the cost can be estimated. In one embodiment, the interconnection netlist can be constructed in the following three stages. First, a bus is created for every label used. Second, switches are introduced. For each edge in the TCG of which two endpoints have the same label, a switch may be introduced in a layer between the two layers represented by the respective TCG subgraphs to which the nodes belong. Third, for each memory, the buses it connects to may be determined by combining all the labels on the edge-endpoints of the transfers from or to that memory. Selection logic may be introduced as part of this process, which can take the form of, for example, tri-state buffers, (de)multiplexers, crossbar switches, etc. The subsequent data path synthesis stage is capable of choosing the implementation of this selection logic and its control circuitry.

Figure 5:
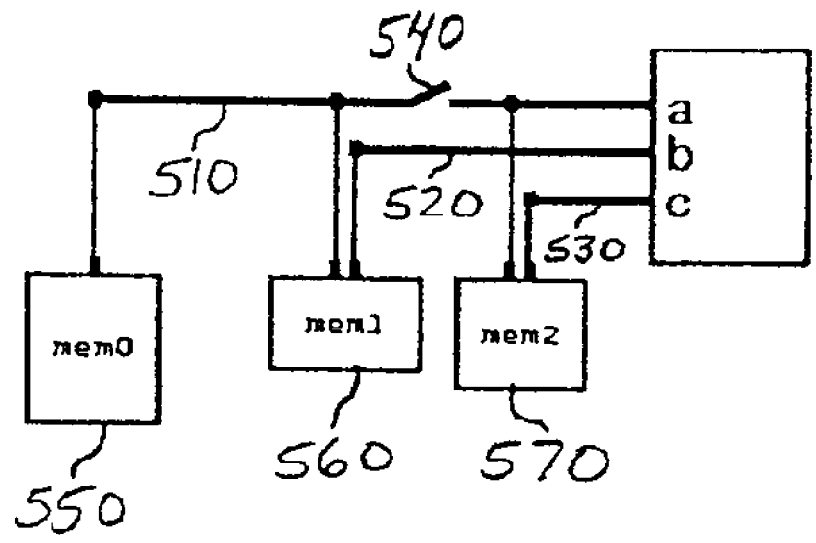
FIG. 5 illustrates an example of the netlist for the labeled TCG shown in FIG. 4, having three buses ('a', 'b' and 'c') and a switch.

FIG. 5 illustrates an example of the netlist 500 for the labeled TCG shown in FIG. 4, having three buses 510, 520, 530 ('a', 'b' and 'c', respectively) and a switch 540. In the first stage, the buses a, b and c 510, 520, 530 are created. In the second stage, the switch 540 is introduced in hierarchy layer 1 because transfer 2 and transfer 4 are both labeled with bus a. In the third stage, connections are made between the memories 550, 560, 570 and the buses 510, 520, 530 according to the labels. A port may also be chosen for each transfer. For example, mem1 560 is accessed by transfers 2 and 3, which are labeled with buses a 510 and b 520. Therefore, one port may be connected to bus a 510, and the other with bus b 520.

The transfers that may not yet be handled after this netlist construction are the memory-to-memory copies within one layer. Typically, it is expected that the number of these copies is low, usually very low. Therefore, the buses for these intra-layer copies may not be globally optimized, but can be added in a locally optimal way. Sometimes it is possible to re-use parts of the buses that are already available. Furthermore, if the memories that are included in these copies are placed close together, the bus length of the extra buses can be kept low. This is also beneficial for power consumption.

In one embodiment, the interconnection netlist is constructed based on a component library that contains all interconnect components, for example, multiplexers/demultiplexers, tri-state buffers, switches, etc. To determine the power and fabrication cost of the netlist, specific information about area cost and power consumption of these components may be entered in the library. With the netlist and the information from the library, the cost of the interconnection architecture can be estimated.

Many elements contribute to the cost of a design, e.g., energy consumption, chip area and the number of metal layers. The energy consumption is important in many applications, e.g., to save battery lifetime or to maximize the system reliability. The chip area proportionally influences the manufacturing cost of the chip. Also the number of metal layers influences the manufacturing cost, in that more layers typically implies more processing stages, and also more expensive production technology.

The energy consumed in the interconnections is due in part to the charging and discharging of the long lines. For these, the energy consumption is proportional to the product of the number of times there is a transition from 0 to 1 or vice versa, times the length of the interconnection line. The toggling frequency of a bus can easily be estimated from the access count of the memories connected to it, assuming that 50% of the lines toggle with every access. The length of a line, however, is much harder to estimate at this high level. One possibility is that a crude floor plan of the chip is given. Indeed, although the data paths are not yet synthesized, the memory system may be known. Since the memories are often the largest blocks on the chip, an initial layout can be made even before the data path is synthesized. Even without such a layout, an estimation can be made based on the sizes of the memories, and assuming that the lower layers of the memory hierarchy also lie farther away from the data path.

The area due to interconnections is even harder to estimate than the energy consumption. Indeed, although the area occupied by the lines themselves is directly proportional to the number of lines and their length, the lines can be routed on top of the transistors themselves, in higher metal layers. However, when many buses are present, so many interconnection lines may be required that either they need extra area dedicated to them, or extra metal layers have to be added to route them.

An alternative embodiment of the present invention, based on clarifying which inputs the method, and apparatus incorporating said method, transforms to which outputs, is presented below.

The previous stages in the DTSE methodology produce information that may be used by the bus-sharing methodology. Input may include information about the conflicts between memory accesses, for example, as produced by the methods of storage bandwidth optimization as described in U.S. patent application Ser. No. 09/360,140, which is hereby incorporated by reference in its entirety. This information can be presented, for example, as a table in which each row indicates one 'abstract storage cycle' and each column indicates a Basic Group ('BG'). Accesses in the same row happen in parallel. The R and W's indicate a read or a write access to/from this basic group. These accesses have to be transformed to 'transfers'. If it is known that two accesses, e.g., a read and a write, that are in the same abstract storage cycle directly pass their information through without any computation in between, these two accesses represent a memory to memory transfer. All other accesses are seen as transfers from the memory to the data path, or vice-versa. Accesses can also be mutually exclusive, i.e., either the first or the second access occurs, but not at the same time.

| Abstract storage cycle | BG 1 | BG 2 | BG 3 |
|---|---|---|---|
| 1 | R* | | R* |
| 2 | | | R |
| 3 | R | W | W |
| 4 | RR | | |
| 5 | | [R] | [W] |

Example of information obtained from Storage Bandwidth Optimization:
A read access to a basic group is indicated by R
A write access to a basic group is indicated by W
Two mutually exclusive accesses are indicated by *
Two accesses that form a memory to memory copy are indicated by [ ]

Other information present includes the assignment of basic-groups to memories. This information may be obtained after performing the 'signal to memory assignment' stage of DTSE. For example, one may assume that there are 2 memories in which the three considered basic groups are assigned in the following way:
Memory 1: Basic-Group 1 and Basic-Group 2
Memory 2: Basic-Group 3
This makes it possible to produce the following table in which accesses to memories are present.

| Abstract storage cycle | Memory 1 | Memory 2 |
|---|---|---|
| 1 | R* | R* |
| 2 | | R |
| 3 | RW | W |
| 4 | RR | |
| 5 | [R] | [W] |

The memory types and specifications may be fixed according to the needed specifications. For example, the number of ports a memory has may be indicated by the maximum number of accesses that occur in the same cycle and the type of ports, e.g., read, write, or read-write. In this example, memory 1 should have at least one R-port and one RW-port and memory 2 should have at least one RW-port.

An additional stage is to assign a unique number to each different transfer that can occur. This could result in the following sequence:

| Assigned transfer number | Source | Sink | Transfer width | Transfer-rate |
|---|---|---|---|---|
| 1 | Memory 1 | Data Path | 8 | 100 |
| 2 | Memory 2 | Data Path | 8 | 200 |
| 3 | Data Path | Memory 1 | 8 | 500 |
| 4 | Data Path | Memory 2 | 8 | 100 |
| 5 | Memory 1 | Memory 2 | 8 | 100 |

Figure 15:
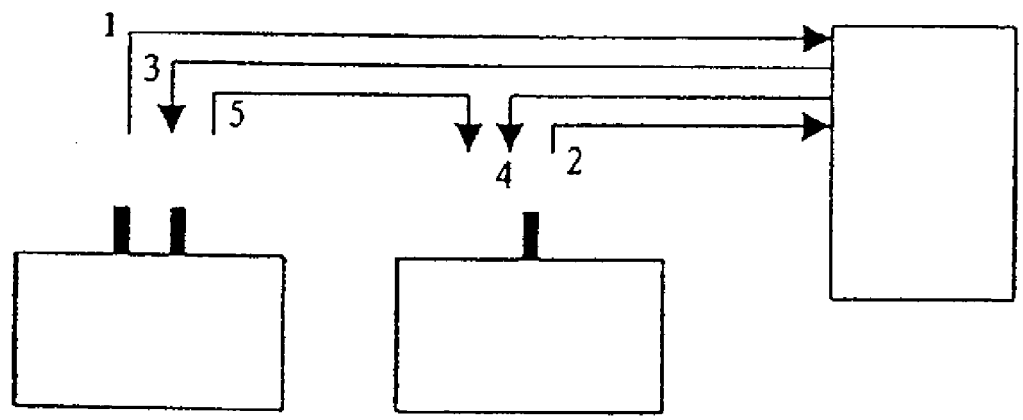
FIG. 15 is a diagram of memories and transfers between the memories.

The two rightmost columns contain additional information about the transfers. This can be derived from the information known about the accesses. Both the transfer-width and the transfer-rate may be used in the cost-function while performing bus sharing. One way to show these transfers is drawing them, e.g., see FIG. 15. FIG. 15 is a diagram of memories and transfers between the memories. FIG. 15 thus shows resources, e.g., data paths, memories and their ports, and indicates, e.g., see numbers 1–5, the transfers in between the resources.

Figure 16:
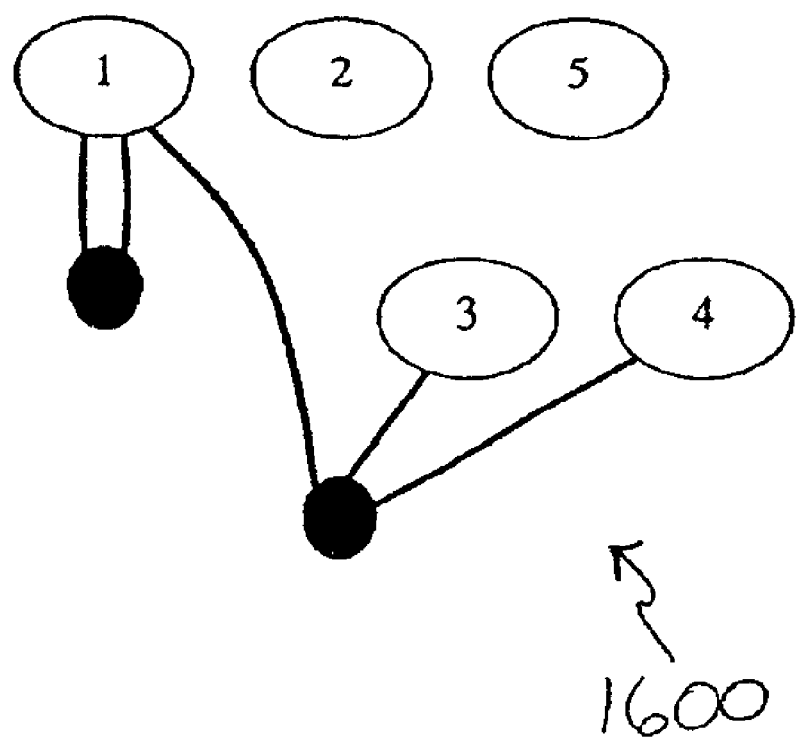
FIG. 16 is a diagram of memory-to-memory-transfer-conflict-graphs (MTCG) used throughout the methods disclosed herein.
Figure 16:
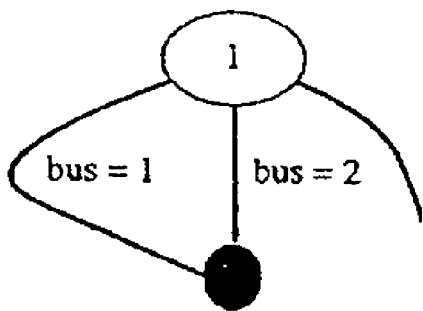

A further stage is to create a MTCG, as shown in FIG. 16. FIG. 16 is a diagram of memory-to-memory-transfer-conflict-graphs (MTCG) 1600 used throughout the methods disclosed herein. This graph may be used by the algorithm of bus sharing. The creation of this graph that follows is based on the preceding two tables. Building this MTCG can be done without taking any design decisions.

Add a node to the MTCG for each different transfer, e.g., see numbers 1 to 5, relating to the transfers shown in FIG. 15.

Add a hyper-edge with edge-ends to the transfers that occur in the same abstract storage cycle, if it does not exist yet, because it can be part of a bigger hyper-edge already, except between mutual exclusive transfers. Each mutual exclusive transfer has its own hyper-edge to the other transfers in the same abstract storage cycle.

In one embodiment of the present invention, the MTCG information about the memories is input for the bus-sharing algorithm. There may be some details given about each memory, e.g., the number of ports, the type of ports, the memory-hierarchy-layer where this memory is present, and its area.

For reasons of power, it may be desirable to assign specific transfers to specific ports on beforehand. Therefore, the algorithm should be able to deal with a (partly) pre-defined transfer to port-assignment. This may be a list that assigns transfers to ports.

The bus-sharing methodology determines which memory is connected to which bus. To obtain the lowest area and power cost, two memories with an intensive interconnection may be placed close together. If information is available beforehand about memory placing, e.g., a crude floor plan, this could be used by the cost-function of the bus-sharing methodology. The cost of a bus can be weighted based on the distance between memories it is connected to. So sharing a bus could be avoided for memory-ports that are placed too far from each other.

To summarize, the possible inputs include the following:
MTCG
Memory information
(partly) predefined transfer to port-assignment
crude floor plan Before being able to describe the method, it should be determined what the desired outputs are. The aim is to be able to construct a netlist that describes the interconnect between memories and the data path. To construct this interconnect, the algorithm is capable of producing information that may include the following:
A list of different buses that are needed.
An assignment of transfers to buses in their different conflict situations, or at least to one bus if there are no conflicts.
For each multiport memory, an assignment of transfers to ports in their different conflict situations.
Since transfers can have their source and sink on different buses, buses need to be able to be connected. They can be connected by a 'switch'. Therefore a list of switches between buses is also produced.
It is desired that the algorithm is able to produce several different bus-sharing solutions. Therefore every solution is provided with a cost, so a choice can be made as to which solutions are preferable and which are not.

The information about different buses and the transfer to bus assignment may be presented in a Memory Transfer Conflict Graph (MTCG). In this graph the edge-ends have a 'label', e.g., see FIG. 17. This label says something about the transfer the edge-end is connected to, namely it indicates which bus the transfer is assigned to as indicated by the hyper-edge where the edge-end belongs. In a 'valid' labeled MTCG, therefore, the labels from the edge-ends of a hyper-edge are different, as two transfers are not assigned to one bus at the moment that they are in conflict. A transfer should at least be assigned to one bus, so if no edge-end is connected to the transfer, it may be added.

Figure 18:
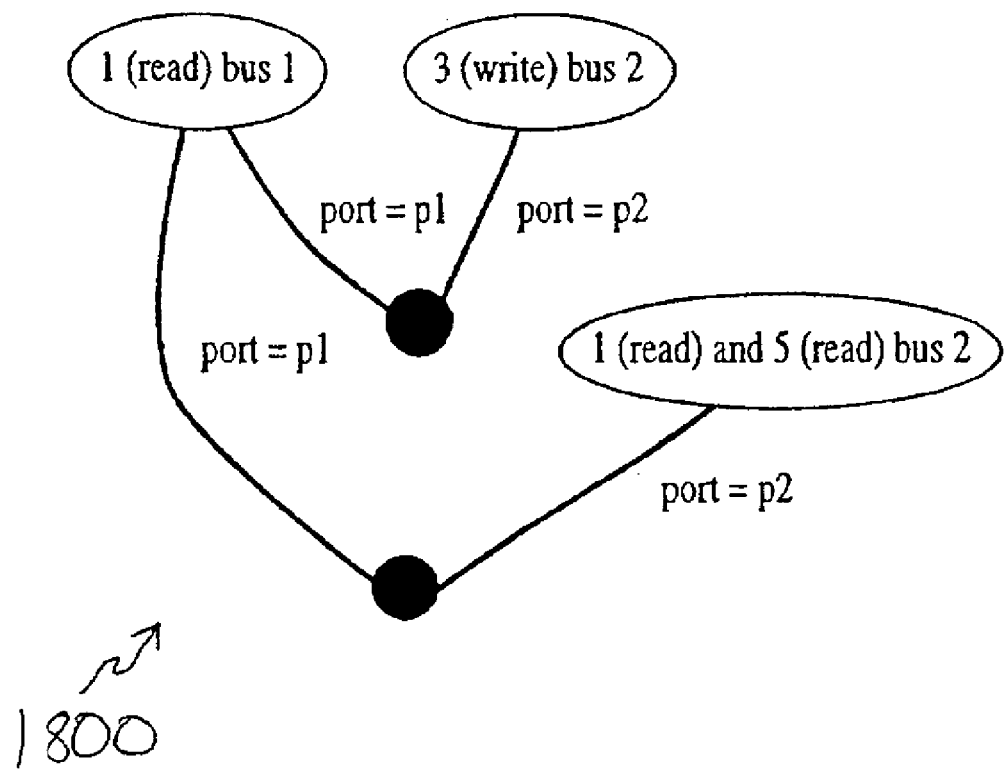
FIG. 18 illustrates an example of a labeled Memory Access Conflict Graph (MACG).

In one embodiment, the assignment of transfers to ports is also presented by the labeling of a graph. Each multiport memory has its own graph. In this graph the nodes are memory accesses to the considered memory by transfers over a bus. The name in the introduced terminology for this graph is as follows: "bus-merged-bus-split-source-sink-split-memory-2-memory-transfer-conflict-graph". The "source-sink split" transforms transfers into accesses. Therefore, this graph may be referred to as a Memory Access Conflict Graph (MACG). The conflicts in this graph, e.g., indicated by hyper-edges, are conflicts between accesses to the memory over a specific bus. These accesses need to be assigned to different memory-ports by labeling the edge-ends. In the example, a valid labeled MACG for memory 1 (with port p1 and port p2) is shown in FIG. 18. FIG. 18 illustrates an example of a labeled Memory Access Conflict Graph (MACG) 1800. It indicates which transfers are assigned to which ports in different conflict situations. The nodes represent memory accesses to the considered memory by transfers over a bus. The edges represent conflicts between accesses to the memory over a specific bus. The labels (port=p (nr)) indicate which transfers are assigned to which ports.

The switches that are introduced are delivered in a list. Each switch describes a source bus and a sink bus to be connected. A switch connects those two buses in one direction only. The width of the switch is also given. This does not need to be the full width of the buses.

The cost is given as a collection of different costs to be combined in some way to decide how appropriate a solution is. The different costs that are determined by cost functions are divided in at least the following:

Local costs, e.g., costs describing the connections from ports to the buses.

Global costs, e.g., costs describing the connections from buses to memories.

Switch costs, e.g., costs describing the connections between buses due to switches Power costs, e.g., cost-estimating power in buses based on connections and transfer rates.

The bus-sharing methodology may be illustrated by an example from the image processing context: the Binary Tree Predictive Coder (BTPC). BTPC is a lossless or lossy image compression algorithm based on multi-resolution. The application may include a number of nested loops. One loop of this application is used as an example. It is complex enough to be tackled by the methodology, yet it is small enough to serve as an illustrative example. The term BTPC is further used to refer to the first loop of the BTPC application.

Figure 6:
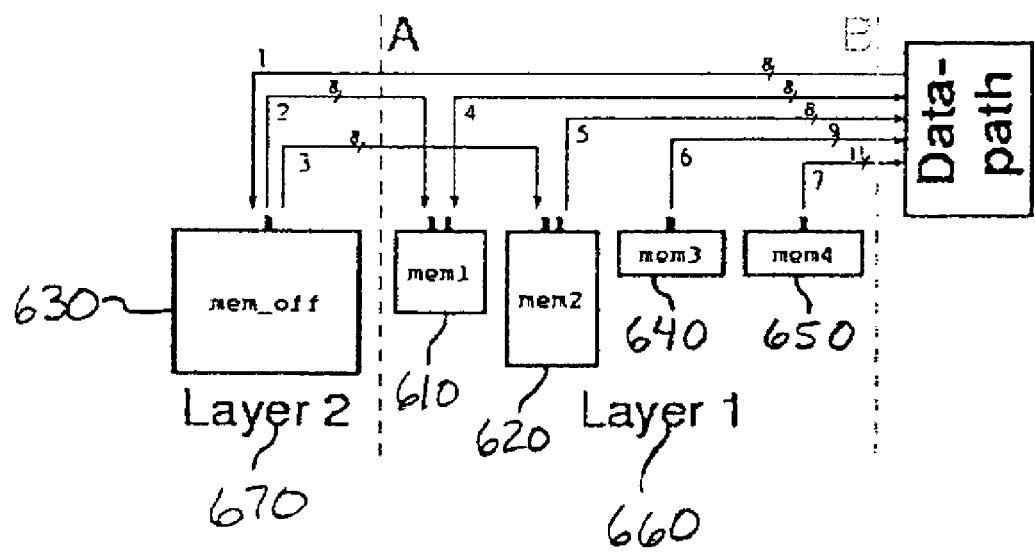
FIG. 6 is a diagram of one embodiment of bus sharing for a Binary Tree Predictive Coder (BTPC) application, including the memory architecture, hierarchy boundaries and transfers.

In a preceding stage of one embodiment, the memory bandwidth requirements were analyzed and a custom memory architecture was derived. The bandwidth requirements may be determined by partially ordering the data-transfers in the application such that the real-time constraints are met. The result of this partial ordering stage is a set of conflicts between the data-transfers. These conflicts are then used as a restriction on the freedom for the custom memory architecture. In addition, the memory architecture shown in FIG. 6 was developed. FIG. 6 is a diagram of one embodiment of bus sharing for a Binary Tree Predictive Coder (BTPC) application 600, including the memory architecture, hierarchy boundaries and transfers. It includes two dual-port memories 610, 620 for the arrays that are accessed very frequently, a large off-chip memory 630, and two further on-chip, e.g., read-only, memories 640, 650 for the other arrays, to minimize power consumption. The memory hierarchy contains two layers 660, 670, with copies from the off-chip memory 630 to two of the on-chip local memories 610, 620.

Without time multiplexing of the memory buses, this example would require seven buses for the application, one for each port in the memory architecture. Also, one port of memories mem1 and mem2 would be connected to the global bus to mem_off, to allow the memory-to-memory copies. Such an architecture requires 60 global wires for the data-bits, and 8 additional control lines for selecting which memory accesses the global bus to mem_off. In an ad-hoc approach to time-multiplex some of these buses, one may try to share one of the ports of mem1 and mem2 with either the bus of mem_off or a common bus for mem3 and mem4. However, both these alternatives lead to a violation of the real-time constraints.

Figure 7:
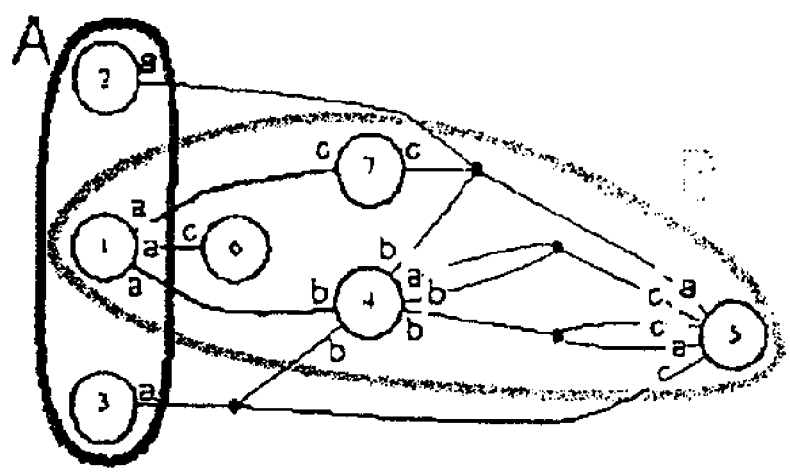
FIG. 7 is a diagram of one embodiment of the bus sharing for the BTPC application, including the labeled TCG with memory hierarchy subgraphs indicated.
Figure 8:
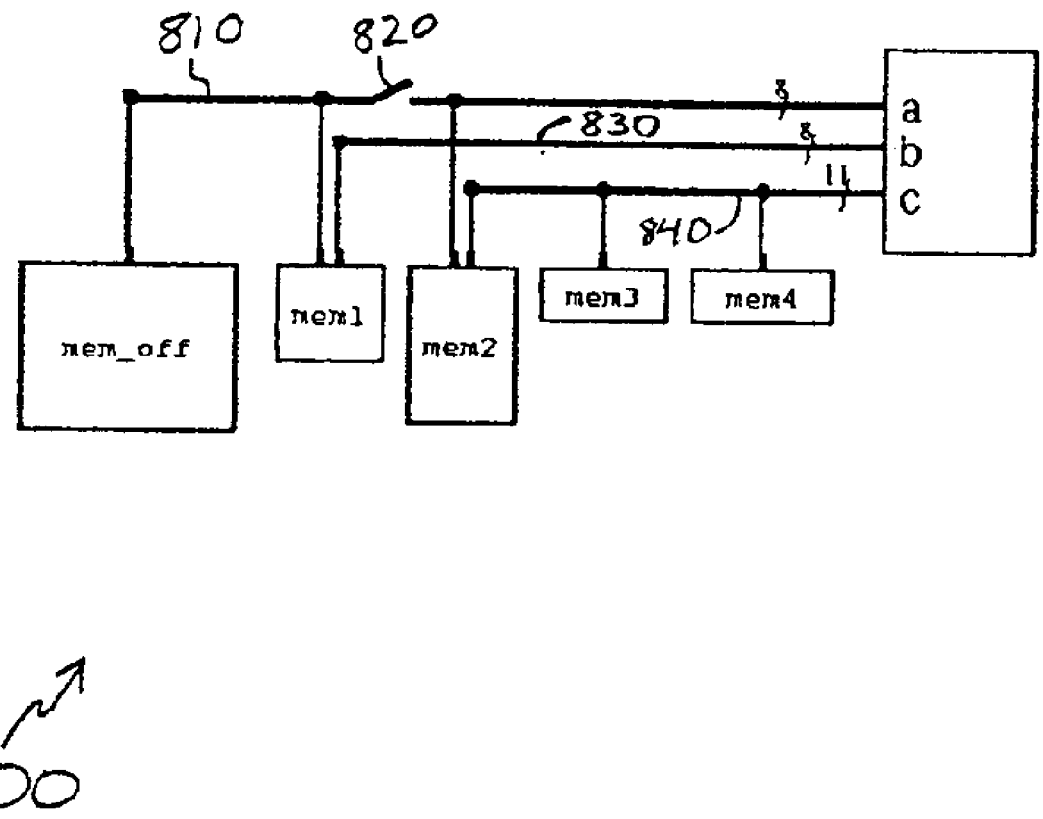
FIG. 8 is a diagram of one embodiment of bus sharing for the BTPC application, including the final netlist.

Based on the partial ordering from the storage bandwidth optimization stage, a TCG is constructed for the BTPC, as shown in the example in FIG. 7. FIG. 7 is a diagram of one embodiment of the bus sharing for the BTPC application 700, including the labeled TCG with memory hierarchy subgraphs indicated. FIG. 7 shows nodes (1 to 6) representing transfers between the resources as indicated in FIG. 6. Subgraphs A and B relate to the memory hierarchy shown in FIG. 6. The labels a, b and c in the example of FIG. 7 result in buses as shown in FIG. 8. Based on this TCG, bus-sharing alternatives may be explored by labeling the graph. In this way, the real-time constraints are met, as no two transfers are assigned to the same bus when they are in conflict. Further, the labeling indicated in the figure lead to the least number of data-wires, and with the least amount of selection overhead.

The number of global memory buses required for the BTPC can be reduced to only three in this example through extensive time-multiplexing. A switch may be required for this, to allow transfers 2, 4, 5 and 7 to go in parallel over the three buses. It is possible to insert a switch here, since transfer 2 goes from layer2 to layer1, while the others go from layer1 to the data path. In the TCG this can be seen from the fact that transfer 2 belongs to subgraph A only, while transfers 4, 5 and 7 belong to subgraph B only. Therefore, transfer 2 and 5 can be labeled with the same bus, a. Without this novel switch architecture, a fourth bus would be required.

The netlist example resulting from the labeled TCG is shown in FIG. 8. FIG. 8 is a diagram of one embodiment of bus sharing for the BTPC application 800, including the final netlist. The number of global buses is reduced from the original seven to only three in this example, at the cost of some extra bus selection logic. Thus, only 27 data wires in total are present in this example of the memory interconnect architecture, and 10 control wires are needed to steer the bus selection logic. This allows an overall reduction of approximately 46% in the number of global wires. Bus a 810 exists in the original, unshared architecture, but a switch 820 has been inserted to isolate transfer 2 from transfer 5. Bus b 830 is essentially not a bus, but simply a point-to-point connection. Bus c 840 is a shared bus, but only unidirectional access from the memories to the data path is needed on this bus, since transfers 5, 6 and 7 are unidirectional, e.g., see FIG. 6. Therefore, only three tri-state buffers are used to implement this bus.

A second driver for this example is an application from the telecommunications and networking domain. The Segment Protocol Processor may be part of an ATM switch. Its function includes storing and forwarding user and internal cells, and processing routing requests and replies. It is capable of working at a very high cell rate and performs look-ups and updates in large tables stored in background memory.

Figure 9:
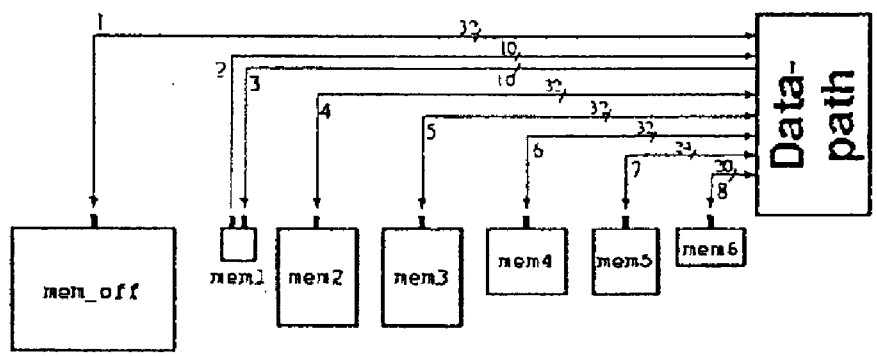
FIG. 9 is a diagram of one embodiment of bus sharing for the Segment Protocol Processor (SPP) application, including the memory architecture and transfers.
Figure 10:
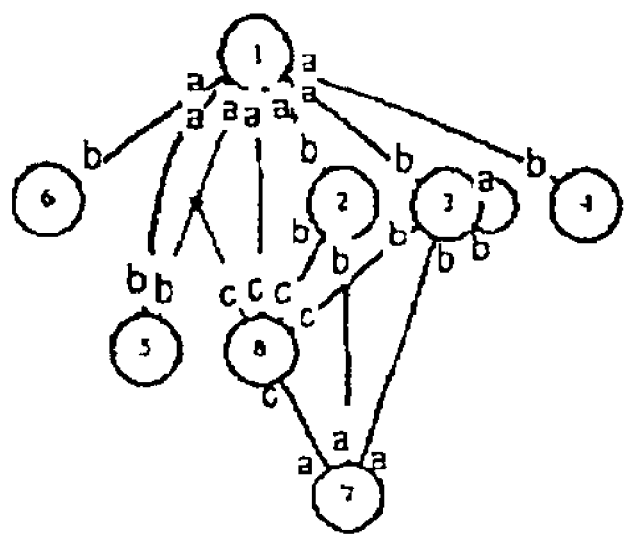
FIG. 10 is a diagram of one embodiment of bus sharing for the SPP application, including the labeled TCG.
Figure 11:
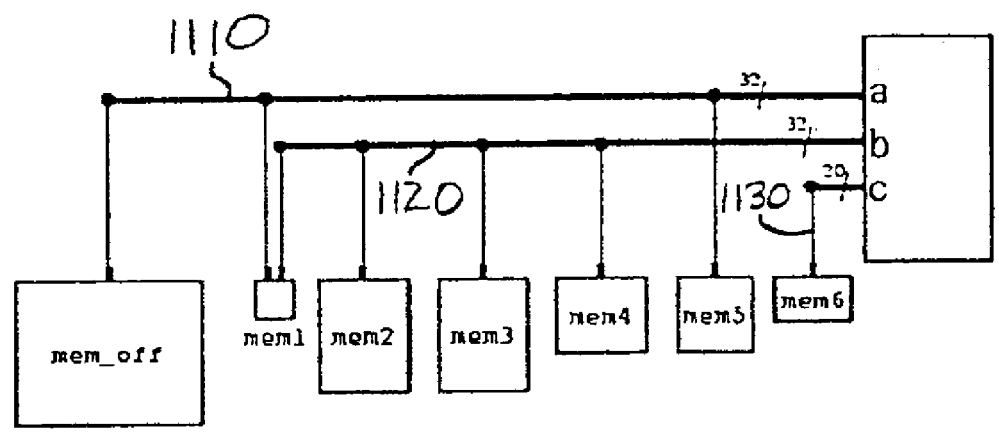
FIG. 11 is a diagram of one embodiment of the bus sharing for the SPP application, including the final netlist.

FIG. 9 is a diagram of one embodiment of bus sharing for the Segment Protocol Processor (SPP) application 900, including the memory architecture and transfers. An optimized distributed memory architecture was derived for this example, as shown in FIG. 9, indicating the resources, such as data paths and memories, of the digital device and eight transfers between the resources. Multiple memories may be required to efficiently store the data, and to meet the memory bandwidth requirements. However, there are still many opportunities for sharing the memory buses. The TCG that comes out of the partial ordering stage is shown in the example in FIG. 10. FIG. 10 is a diagram of one embodiment of bus sharing for the SPP application 1000, including the labeled TCG. FIG. 10 shows nodes (1 to 8) representing transfers between the resources as indicated in FIG. 9. The labels a, b and c result in buses as shown in FIG. 11. FIG. 11 is a diagram of one embodiment of the bus sharing for the SPP application 1100, including the final netlist. Indeed, although there are many conflicts in this graph, the maximum hyper-edge is only of degree 3. Therefore, the number of buses 1110, 1120, 1130 in this example can be reduced to three, resulting in the netlist shown in FIG. 11.

Applying the bus-sharing approach example yields a reduction in the number of global data-wires from 192 lines to only 94 lines. To achieve this, seven tri-state buffers and seven latches may be added, incurring an additional overhead of 14 control wires. This means an overall reduction in the number of global wires of approximately 44%.

In an alternative embodiment, a system-level method with a multi-boundary transfer splitting approach, leading to a slightly other concept of switches, is presented.

In the MTCG it is assumed that the different transfers do have their own node. Transfers need to be assigned to buses, which may be done by assigning labels that indicates buses. A transfer can be assigned to different buses. Theoretically it can be assigned to a different bus in each conflict situation. In the MTCG, each hyper-edge represents a conflict situation, therefore the labels for assigning one transfer to a bus are present at the edge-ends adjacent to the transfer-nodes. Hyper-edges are present when there are conflict situations. So a transfer that is at no moment in conflict with another transfer would not be assigned to a bus.

Figure 19:
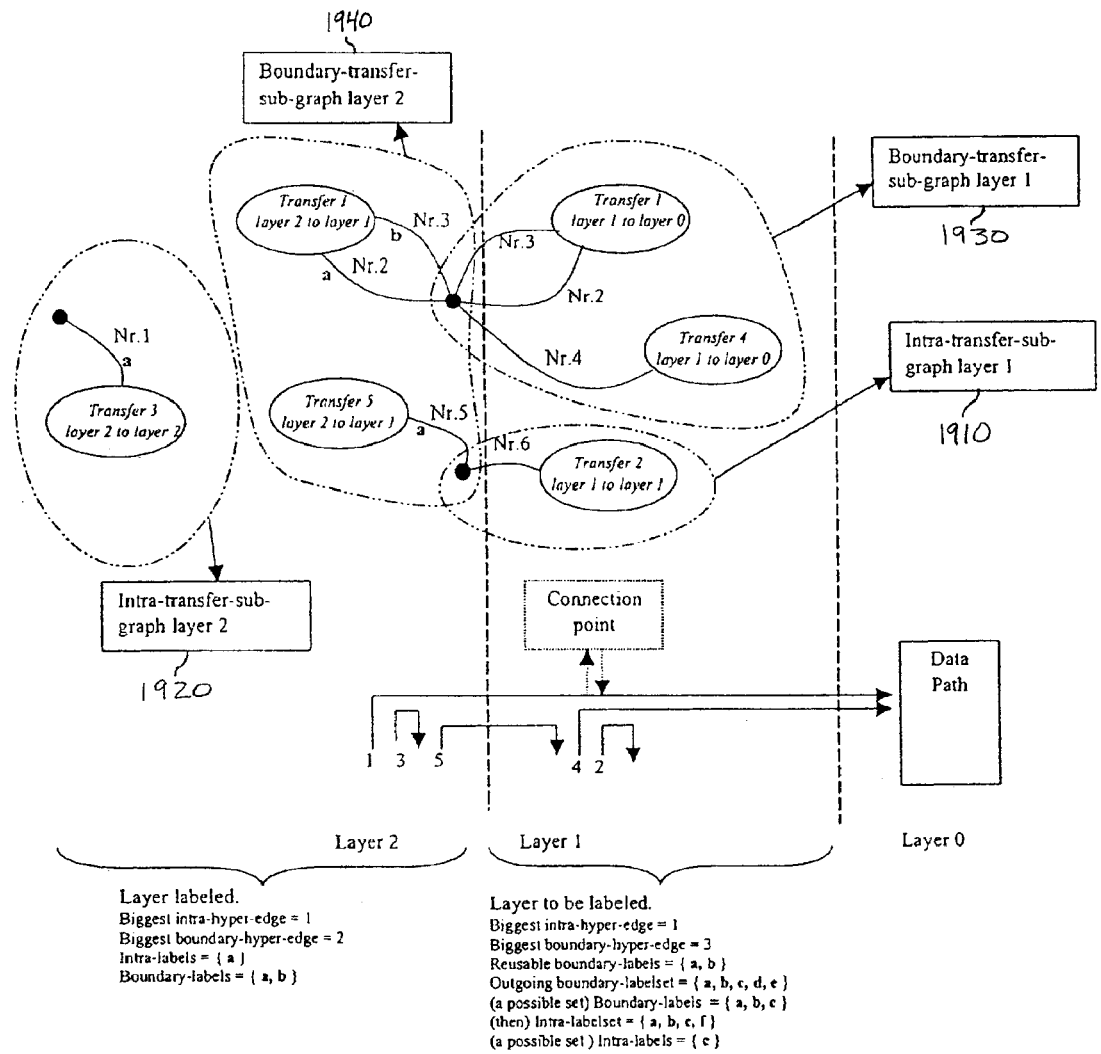
FIG. 19 is a graph with several definitions of layers, subgraphs and label sets.

To avoid this, there is a new hyper-edge with one edge-end introduced for transfers that are not in conflict, so each node has at least one adjacent edge-end. One rule that is going to be taken into account during the label-assignment is that the edge-ends of one hyper-edge are different. In this way, transfers that occur at the same moment are assigned to different buses at that moment. Bus sharing is thus optimized layer by layer. The layer-division is indicated by dividing the original MTCG into several subgraphs. One layer consists of 2 subgraphs. One subgraph contains the transfers that start and end within the same layer, e.g., the intra-layer transfers. Another subgraph contains the transfers that cross the layer-boundary from this layer to a lower layer, e.g., boundary-layer transfers. In this way, the transfers are included in the subgraph. Also, hyper-edges and edge-ends are included in the subgraphs. As soon as a node, e.g., transfer, is included, its adjacent edge-ends are included too, together with the core of the hyper-edge, so the edge-ends adjacent to different transfers are not included, as shown in the example of FIG. 19. FIG. 19 is a graph 1900 with several definitions of layers, subgraphs and label sets. FIG. 19 shows nodes relating to transfers within one layer or over two layers, e.g., shown by number 2 ('nr. 2') to number 5 ('nr. 5') in FIG. 19, or a plurality of nodes, related to a transfer over more than two layers, e.g., transfer 1 has two nodes; transfer 1 layer 2 to 1 and transfer 1 layer 1 to 0. Besides indicating which transfer it represents, within said nodes also given is an indication about the involved layers. The nodes may be grouped into subgraphs. One example of a class of subgraphs is intra-transfer subgraphs. Another example is boundary-transfer-subgraphs. As shown in FIG. 19, two intra-transfer-subgraphs 1910 and 1920 are shown and two boundary-transfer-subgraphs 1930 and 1940 are indicated. Note that the layers relate to the memory hierarchy layers. The labels 'a' and 'b' in FIG. 19 refer to the buses needed within the digital device.

The aims of bus sharing include minimizing the amount of buses crossing layer-boundaries and minimizing the amount of buses within a layer. Note that the different buses used by a set of transfers can be determined from the graph by extracting the set of labels assigned to these transfers. The minimum number of needed buses is indicated by the biggest hyper-edge in each subgraph. In the whole MTCG, normally bigger hyper-edges are present. This may sometimes obstruct labeling the subgraphs with a minimum amount of different labels. This is because of transfers that pass several layer-boundaries. Their node would be present in several subgraphs. It can introduce too many different assigned labels when starting labeling a new subgraph, so the minimum amount is exceeded. This can be avoided by splitting up these multi-boundary transfers. To ensure the minimum number of buses on layer-boundaries, the idea of connection-points and switches is introduced. Before the MTCG is split into subgraphs, the transfers that pass more than one layer boundary are split up into separate parts, each part crossing only one boundary. The parts that were split are going to be connected to 'connecting points'. For example, a transfer originally beginning in layer 1 and ending in layer 3, may be replaced by two transfers, the first starting in layer 1 and ending in layer 2 on the connection point, the second starting again at the connection point and ending in layer 3. 'Connection points' indicate the presence of switches between buses and do not actually physically exist. A transfer would be present in one subgraph of the MTCG. Splitting transfers means for the nodes in the MTCG, duplicating the nodes and changing the name so it is indicating which layer-boundary the transfer crosses. For the hyper-edges in the MTCG that indicate the conflicts there is more happening. It is noted that one hyper-edge indicates a conflict situation at a specific moment in time. A transfer is split into more parts. This splitting is a splitting in space, the different parts of the transfer still occur at substantially the same moment. Therefore, the hyper-edges connected to the original transfer-node are connected to the duplicated nodes also, e.g., by creating extra edge-ends. This increases the size of hyper-edges, but due to the duplicated nodes being in different layers, the biggest hyper-edge in each layer isn't affected. When labeling hyper-edges, two parts of split transfers are assigned to different buses, because of the introduced extra edge-ends in the existing hyper-edges. This is undesirable, as a path would be created between the two buses by introducing a switch. This can be avoided by adapting the rule of a valid labeling, i.e., a hyper-edge is labeled in a valid way as long as the labels assigned to an edge-end and its duplicates are different to the remaining labels. This rule can be simplified by numbering the edge-ends in the original MTCG. When an edge-end is duplicated the number remains the same. The rule becomes that all edge-ends have a different label with the exception of edge-ends with the same number, which may have the same label. Now it can be explained when a switch needs to be introduced. One connection-point introduces the following switches: Consider the transfer to this connection point and the transfer from this connection point. These two transfers, e.g., originating from the same multi-boundary transfer, have the same number of adjacent edge-ends with the same numbers. A switch may be introduced as soon as two edge-ends with the same number, e.g., one adjacent to one transfer, the other adjacent to the second transfer, are assigned to different buses. These two buses are connected by a switch to create a path for the original multi-boundary-transfer. The width of the switch and its direction depends on the transfer. A switch is introduced to be used only for this specific transfer at the moments indicated by the hyper-edges. However, if another switch is needed connecting the same buses in the same direction, the switch may be reused, as there is no reason to introduce another switch in parallel to the first one. Eventually, its width needs to be adapted, e.g., only extending may be allowed. The possibility that also non-multi-boundary-transfers can use the switches will be discussed later. Also, the reuse of connection-paths using more than one switch is not considered herein. Determining which set of labels to use to label a subgraph is not trivial. The set of labels determines which buses the transfers are assigned to. Typically, it is desirable to reuse buses that are introduced in higher layers, but this is not always possible so new buses may need to be introduced and old ones may not be used anymore. When starting the labeling a layer, some things are considered as follows:

the different boundary-buses originating from the higher adjacent layer that is already labeled, e.g., reusable boundary-labels;

the amount of different labels, e.g., buses, allowed to label the intra-transfer-subgraph, e.g., biggest intra-hyper-edge IH;

the amount of different labels, e.g., buses, allowed to label the boundary-transfer-subgraph, e.g., biggest boundary-hyper-edge BH;

The following may be determined:

the different buses allowed to be used to label the boundary-transfers, e.g., outgoing boundary-label set;

the different buses allowed to be used to label the intra-transfers, e.g., intra-label set;

the different buses to be used to label the boundary-transfers, e.g., boundary-labels (subset from 'outgoing boundary-label set' with cardinality BH);

the different buses to be used to label the intra-transfers, e.g., intra-labels (subset from 'intra-label set' with cardinality IH).

In one embodiment, the 'outgoing boundary-label set' is determined. This set includes 'reusable boundary-labels' with the number of BH new labels. This is to enable the possibility to label this graph with a new set of labels. From this label set a subset of BH labels is taken, e.g., boundary-labels. The possible subsets may be produced one by one. For each different set 'boundary-labels' the 'intra-label set' is formed. The 'intra-label set' includes the combination of 'boundary-labels', 'reusable boundary-labels' and IH new labels. From this label set a subset of BI labels may be taken, e.g., intra-labels. The possible subsets may be produced one by one. This results in many different situations with two label sets, e.g., intra-labels and boundary-labels. These label sets are assigned to the edge ends in the corresponding subgraphs of a layer as 'sets of possible labelings'. When hyper-edges are labeled, each time a label is taken from this set. The edge-ends within the one layer are labeled. While labeling a hyper-edge, the edge-ends belonging to one of the layer-subgraphs are affected. Edge-ends in higher and lower layers are not changed, although they are considered when the valid labeling-rules are applied. In that case, edge-ends in lower layers still without a label may simply be ignored.

Because of reasons mentioned above, it is possible that a given label-set does not give any valid-labeling situation. This is found quickly and then this set is refused. A next set may be taken. It is ensured that there is a set that does enable a valid labeling, e.g., it is always possible to take a complete 'new' set of labels compared to earlier layers, but this will generally introduce extra switches. To determine if a label-set gives a valid labeling, try to find a valid labeling for each hyper-edge. When one hyper-edge is found that cannot be labeled in a valid way, the used label-set can be refused. Labeling may start with the highest layer, e.g., most background, because, in general, interconnect is more costly here. After finishing one layer, its labels are 'fixed' and based on that situation the next layer is labeled.

In an embodiment of the present invention, each labeling-solution is only a solution for bus sharing. Within this solution there may be more to explore, for example, the way the transfers are assigned to memory-ports. The question was where to place the port-assignment stage while performing bus-sharing. Both actions are intensive related. A 'good' bus sharing solution can imply a non-optimal port assignment. So, a solution was found to fulfill both tasks in such a way that a good overall solution can be found. Because of the kind of transfers that have been assigned to buses, e.g., memory to memory transfers, transfer to bus assignment and transfer to port assignment can be nearly de-coupled. Consider the moment that all transfers in a layer are assigned to buses, e.g., one labeling solution is produced. Indirectly, buses are assigned to memories, e.g., relation transfer-memory is known and relation transfer-bus is known. The decision for port assignment can be done locally, for each memory, one by one. An assignment to one memory does not affect the possibilities for other memories. Note that this extra assignment freedom is only present around multi-port memories. How to explore this local search space in a structured way is now described. Assigning buses to ports can only been done when conflicts between transfers are taken into account. In addition, the direction of the transfers is also important. There is at least one solution that is feasible, that is the result of earlier decisions made in DTSE stages, e.g., the amount of ports is adapted to the needed parallelism. But if there are more possible solutions, the best one should be chosen.

Another conflict graph is introduced, e.g., for each multi-port memory, to explore this search space. This graph is deduced from the original MTCG. Its name is bus-merged-bus-split-sub-memory-source-sink-split-memory-2-memory-transfer-conflict-graph, e.g., indicated by MACG. The conflicts that are considered for port assignment are nearly the same conflicts that are present in the original MTCG, but now one physical place is taken into account, for example, where the transfers start and end, at a memory. Here, the transfers are seen as accesses, e.g., a read or a write. If such accesses are in conflict they cannot be assigned to the same port at that conflicting moment. By taking the original memory-2-memory-transfer-conflict-graph and source-sink-splitting the transfers, the transfers change into accesses, e.g., each transfer transforms in an R-access and a W-access, these two accesses are in conflict. Because we consider only one multi-port memory at the time, only those accesses accessing this memory are considered, therefore a selection of nodes is made, e.g., sub-memory. Each access is split according to the different buses it is assigned to, e.g., bus-split. The conflicts are divided over the split nodes by taking into account which bus is involved. The graph now indicates conflicts among accesses (R of W) coming from a specific bus. Accesses from one bus are not in conflict because of the correct bus-sharing. Therefore, R-accesses and W-accesses, e.g., nodes from the same bus can be merged, e.g., bus-merged. The graph now indicates conflicts between memory-accesses occurring from a specific bus, therefore this graph could be called a Memory-Access-Conflict-Graph. In this way, even a transfer that has its source and sink in at the same memory is correctly handled. Both its conflicting R and W access will be present in the final MACG. Each edge-end is to be labeled. The labels assign an access, and its original transfer, to one or more ports because each different label represents a different memory port. The label-set used to label the edge-ends initially contains all memory-ports. The label-sets with possible labels for each edge-end may be adapted to the kind of access. Not every access can be assigned to every port. The read/write properties typically match, e.g., a R-access matches a R-port and a RW-port, a W-access matches a W-port and a RW-port. So for each node in the graph, a set of possible assignments may be made. A labeling is valid if the endpoints of a hyper-edge have a different label. An exhaustive search of the possible labelings can be done. Every possibility may be weighted using a cost function. Only the best solution is typically kept, because by choosing a solution here, no restrictions are introduced for other assignments around other memories.

The labeled MTCG is an abstract representation of the transfer to bus assignment decisions and the labeled MACGs are abstract representations of the transfer to port assignment decisions. For further synthesis of the application, these representations are translated to a list of connections between memory ports, buses and the data path. Based on this interconnection netlist, the cost can be estimated. In one embodiment, the interconnection netlist can be constructed in the following three stages. First, a bus may be created for every label used in the MTCG. Second, switches may be introduced for every pair of hyper-edge end-points that match the following 3 conditions: 1) They originate from the same end-point before transfer splitting; 2) Their adjacent transfers have the same connection-point as destination; and 3) Their labels are different. A switch needs to be introduced between two buses only once. Third, for each memory-port, the buses it connects to may be determined by combining the labels on the edge-endpoints of the transfers and accesses from or to that memory.

Figure 17:
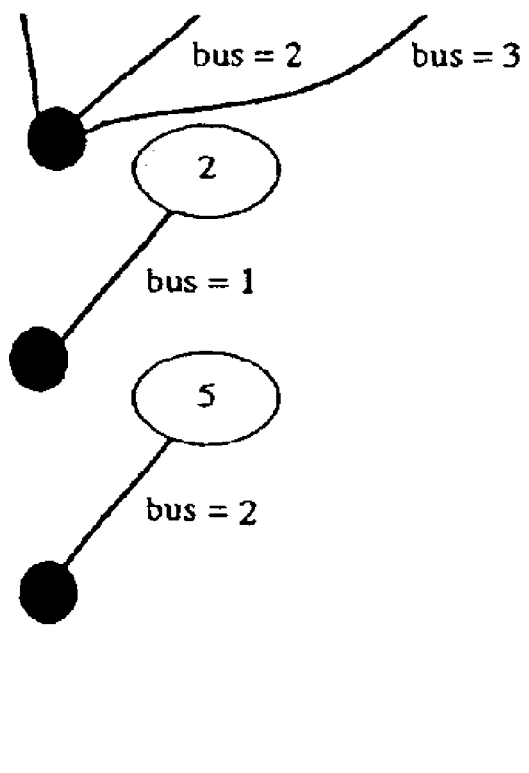
FIG. 17 illustrates an example of the labeled MTCG graph.
Figure 20:
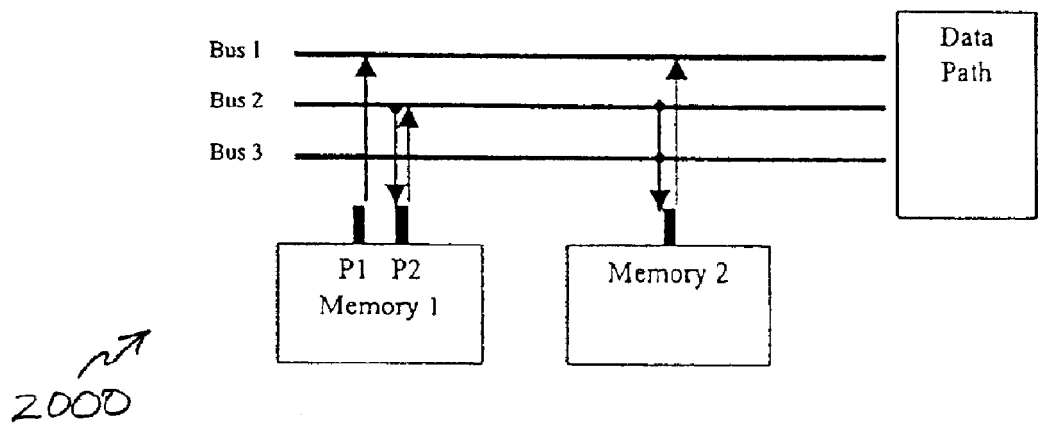
FIG. 20 illustrates an example of the resulting netlist for the labeled MTCG of FIG. 17.

Selection logic may be introduced, which can take the form of, for example, tri-state buffers, (de)multiplexers, crossbar switches, etc. The subsequent data path synthesis stage could choose the implementation of this selection logic and its control circuitry. FIG. 20 illustrates an example of the resulting netlist 2000 for the labeled MTCG of FIG. 17. FIG. 17 illustrates an example of the labeled MTCG graph 1700. In the first stage, buses 1, 2 and 3 are created. The second stage can be skipped, because no switches are used here. In the third stage, connections are made between the memories-ports and the buses according to the labels in FIG. 17 (MTCG) and FIG. 18 (MACG). As an illustrative example, memory 1 is accessed by transfers 1, 3 and 5, which are labeled with buses 1 and 2. The read access caused by transfer 1 to bus 1 is assigned to port P1, so P1 and bus 1 need to be connected. Before the final netlist can be presented, a post-processing stage can be inserted to get an even more optimal solution. The non-optimality is caused by the introduction of the switches. This stage is explained in greater detail below.

Figure 21:
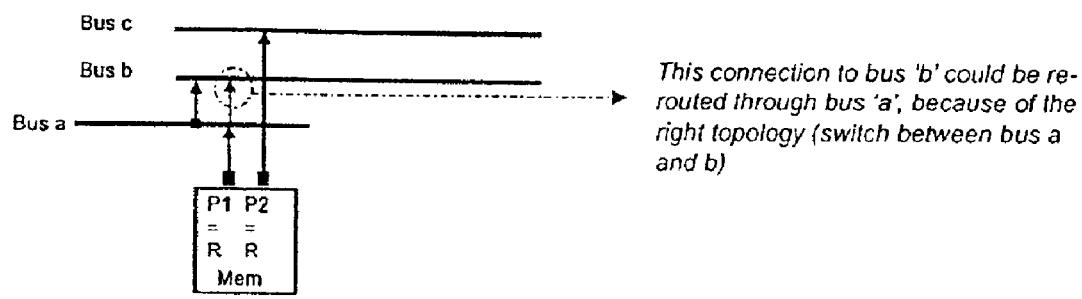
FIG. 21 illustrates an example in which two ports are connected to three buses.

Having introduced a switch between two buses, it is possible that memories connected to both buses have redundant connections. This is because a switch is introduced for transfers crossing more then one layer-boundary only. It is typically not taken into account that other transfers can use this switch too. To avoid this, one possible example of how to deal with redundant connections is based on post-processing after conducting the labeling process. In this example, the different connections of ports to buses are checked and a decision is made if this point can be ignored. A connection can be ignored when the connection is redundant in terms of topology, e.g., see FIG. 21, which illustrates an example in which two ports are connected to three buses, or the transfers from the port to the bus, or the other direction, have another path to the same bus, e.g., by a switch. The direction of the switch and the direction of the transfers are generally taken into account. Moreover, the width of the switch should be sufficient considering the width of the bus, or if not, it could be made wider.

Figure 22:
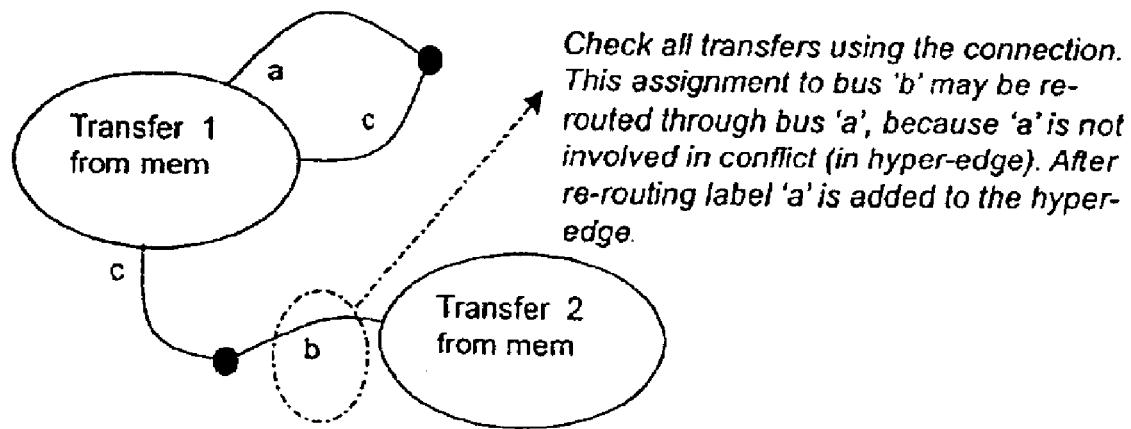
FIG. 22 illustrates the process of checking for redundant connections.

A connection can be ignored when the connection is redundant in terms of conflicts, e.g., see FIG. 22, which illustrates the process of checking for redundant connections. The different transfers passing this connection may not be in conflict with the transfers in the other bus, e.g., here bus 'a'. To verify this, the MTCG is considered. Look for the transfers using the considered connection, e.g., transfers from port 1 assigned to bus 'b', and check if they are not in conflict with any transfer assigned to bus 'a'. If this is the case, the connection may be added to an 'ignore list'. In the MTCG it is indicated that the 'moved' transfers occupy bus 'a' also, because when checking if other points can be ignored, this extra occupation of a bus should be known. This indicates that by ignoring a connection, the possibility of ignoring others can change. In this situation, an exploration can be used to find the way the most points can be ignored. In situations with more switches this same method can be used to re-route transfers over more than one switch. This process of performing this optimization is typically not trivial. In this example, the proposed automated algorithm does not take into account this kind of connections-ignoring-optimizations.

Other examples of avoiding redundant connections can be based on a different way of splitting transfers into parts. A connection point can be created for each transfer, even when it is not crossing more than one layer-boundary. This splits transfers into at least two parts, such that source and sink can be assigned to different buses. This generates a much more complex conflict-graph and many labeling-situations that introduce an unnecessary amount of extra switches. A similar result could be archived by splitting every transfer in the MTCG in two accesses, e.g., a read and a write access. When labeling such a graph, switches may be introduced when the source and the sink from one transfer are not fully assigned to the same buses. Indeed, this opens the possibility for all the transfers to use switches, but the situation is not optimal, as many labeling situations result in an undesired number of useless switches.

The notion of switches is introduced to be capable of realizing the minimum amount of buses on layer-boundaries. In an embodiment of the present invention, a switch concept, wherein a switch can break a long bus into parts, is used so the bus can be used for one transfer crossing several boundaries, e.g., switch closed, or for two conflicting transfers on both sides of the switch, e.g., switch open. There is not the capability to assign a multi-boundary transfer to more than one bus in one conflict situation, so it uses the same bus crossing more boundaries. In another embodiment of the present invention, an additional approach is provided. In this embodiment, switches no longer break a bus into parts, but they connect two different buses. Together with the introduction of 'connection-points' this provides much more freedom and flexibility.

The cost-function is capable of estimating the quality of the generated netlist, based on transfer-bus assignments, labeled MTCG, the transfer-port assignments, labeled MACG'S, and results of the post-processing.

The cost estimation can be divided into parts:
a local estimation consisting of:
tri-state-buffer-cost
a global estimation consisting of:
global area-cost
global switch-cost
global power-cost In one embodiment, the local and global estimations are intended to be kept simple, to be used in a first prototype of the port-assignment and bus-sharing algorithm. Direct countable amounts of elements are taken into account. The absolute values are generally not considered, because the results are used merely to make it possible to compare different solutions of port assignment and bus sharing. The total cost includes a presentation of the different costs. These costs can be compared when different solutions are calculated. One way to find the best solutions can be to draw a pareto curve from the solutions and thereby choose some optimal solutions. The cost can be calculated layer by layer. Thus, transfers to memories and connection points in the current layer are considered when calculating local and global costs.

In one embodiment, for the local estimation of the tri-state buffer cost, the interconnections between memory-ports and buses are considered, looking to the amount of needed buffers and multiplexers. The interconnections are typically short, e.g., the bus is assumed to be nearby the memory, so the area used by the logic elements becomes a factor. The local cost is connected to the task of port-assignment, which is performed for every (multi-port) memory separately. For each possible and valid way of connecting the memory-ports to buses, a cost evaluation can be done. Typically, the best port-assignment solution is kept, as keeping more than one is generally not useful since the decision made for one memory does not influence local costs for other memories, because at the moment of port-assignment transfers are assigned to buses already. The sum of the local-costs of the optimal port-assignment solutions around the memories is stored. In this way, the optimal port assignment, within one bus-sharing solution, is found. Local estimations can be done for both multi-ported and single-ported memories. However, for single-ported memories, generally a single way of connecting the ports to the buses is available.

In the algorithm for port assignment, the memory access conflict graph (MACG) was introduced. A labeled MACG may be used to do local cost estimation, which may include the following information:

Because from each transfer in each bus it is known to which port it is assigned, it is known to which different buses all memory ports have to be connected.

For the connections between a port and a bus the direction of data transports is known, because the directions of all transfers in this connection are known, e.g., read or write to this memory.

For the connections between a port and a bus the width may be fixed by the maximum width of the read transfers and the maximum width of the write transfers over this connection, which can be different for read and write.

With this information, the optimal number of tri-state buffers and multiplexers is known. To be able to produce one cost of this logic, the following simplification can be made. Multiplexers can be built by using tri-state buffers, except some select logic, so the basic building blocks that are going to be counted are tri-state buffers. To connect one one-bit width port to one bus in one direction, one buffer is needed. For each additional bit width, one extra buffer is needed. To automate this cost estimation, the information can be abstracted from the MACG. Therefore, it may be simpler to look to buses that are connected to ports instead of ports that are connected to buses, because a grouping into buses is already present in the graph. Within this graph, the accesses are grouped into parts assigned to the same port. These are referred to as port-groups. In each port-group, the bit width of the widest write, e.g., max_width_W, and read, e.g., max_width_R, transfer may be selected. The sum of these values is the amount of buffers needed to connect one port to one bus. The number of buffers to connect one memory to the buses can be found by looking to the port groups in the graph. From each different labeling of a MACG, the solution with the minimum cost can be optimally chosen. The total local-cost is the sum of all minimum costs per memory.

In an embodiment of the present invention, the global switch-cost, the logic for the switches in a layer is taken into account. A unidirectional switch with width W to connect two buses costs the amount of W tri-state buffers. Where a switch is introduced with which width can be derived from the labeled MTCG. A switch may be introduced when two parts of a multi-boundary transfer, e.g., coming from and going to one connection point, have two adjacent edge-ends with the same number, and a different label. The width of the switch equals the width of the transfer. If a second switch is introduced between the same two buses, only one switch with the maximum width is needed. To be able to determine if a switch is already present, a list of switches is made. The total amount of tri-state buffers used is calculated.

In the global area-cost estimation, the interconnect area used by buses is considered. An attempt may be made to say something about length and width of the buses. This sometimes can not be done precisely, because placing of the component may not be known. More can be said when a crude floor plan is present, although this is not assumed here. However, the information that is present can be used to make an estimation. Given a labeled MTCG, the following information about the buses may be included:

Because of the transfer to bus assignment, the transfers in a bus are known. Its minimum width can be determined, e.g., the maximum width of all transfers using this bus.

Because the transfers in a bus are known, it is known which memories have to be connected to this bus.

Further, the size of the different memories is known. The width of a bus indicates its relative width. The information about which memories a bus has to pass roughly indicates the length of a bus. Each memory to connect extra will in most cases increase its length (at least not decrease). Connections to memories in the current layer are counted, as otherwise the cost for buses that cross several borders would be counted more than once. The increase in length of a bus because of a switch between buses is neglected because it is assumed that two buses will be close together somewhere, e.g., nearby layer-boundaries. There a switch can be introduced without increasing the bus-length. The length-estimation may be based on the so-called semi-perimeter method. The method includes finding the smallest bounding rectangle that encloses all the pins of the net to be connected. This bounding rectangle is calculated here roughly by adding the memory-sizes of the connected memories and calculating the semi-perimeter of a square with the same area. Multiplying the 'width-estimation' and the 'length-estimation' gives a cost that can be seen as an 'area-estimation' of one bus. Note that the width of one bus can differ. On each layer-boundary, the minimum width can be determined, for example by looking for the widest transfer going over it on that place.

In one embodiment, power is estimated for each bus. The information may include bus-power information, for example, bus-length estimation and a toggling-activity estimation. The bus-length may be in relation to the bus-capacity, as the toggling-activity determines how often this capacitor needs to be charged. Here, the length of the bus in the current layer is less important and its total length is more important. When optimizing a layer, the length of the bus in higher layers may be known, while the length of the bus in lower layers may not be known. So the length-estimation in this embodiment may be the sum of the lengths in higher layer. The more layers are labeled, the more precise the estimation can be. The length-estimation of a bus may be similar to the length-estimation used during bus-area-cost estimation. Long buses with high transfer-rates are typically power consuming. This makes it preferable to use short buses connected by switches. For an estimation of the toggling-activity, the width of a bus is not as important, while the width of the individual transfers is more important, because only bits that toggle are power consuming. The given transfer-rate per transfer may be used to determine the toggle-activity. There may be a problem when transfers are assigned to more than one bus. From the given input information, it is difficult to derive the percentage of time a transfer is in a specific conflict situation, e.g., assigned to a bus. So this may be neglected in the power estimation. The percentage of time a transfer is in a specific conflict situation assigned to different buses may be estimated, e.g., this can be divided uniformly over the buses. Transfers with high rates should avoid long buses and transfers with high rates should also be transferred over the smallest number of different buses.

The different costs may be collected and combined in a way to say something about the over-all quality of a bus-sharing and port-assignment solution. One optimal way to trim out solutions is to make a so-called pareto-curve. Solutions in which the costs are worse, e.g., as compared to other solutions, can be thrown out. However, still more solutions can be thrown out. Thus, the costs may be combined in a weighed cost and this cost may be used to verify the quality of a solution.

The local-cost and the switch-cost can be added, because they both count the number of tri-state buffers. The other costs are different and their weight factors can be found according to desired results, e.g., the optimization power-oriented, the area-oriented, or the like.

Hierarchical, distributed memory organizations can provide parallelism in the data transfer and drastic reductions in the power consumption. However, their interconnection architecture may incur a large overhead if not carefully designed. The large memory buses are partially responsible for this overhead, and at the system level there exist many opportunities for time-multiplexing the data-transfers along such buses.

One embodiment of the present invention provides a system-level methodology that reduces the number of interconnections by sharing transfers to or from different memories over the same bus. Such an embodiment is based on a labeling method for the given memory transfer conflict graph. This labeling technique supports multi-port memories, switches in the interconnect architecture, and memory-to-memory copies between different layers in the memory architecture. It is based on system-level constraints on the background memory bandwidth, as opposed to detailed scheduling of foreground operations.

The effectiveness such an embodiment may be demonstrated by examples of several data-intensive applications for which a custom memory organization was designed. One example is from the multimedia domain, and another example is from the network component domain. Roughly a factor of two may be gained in terms of number of global wires, including control wires. In these examples, the bus-sharing can be automated and with heuristics can be applied to large designs.

While the above detailed description has shown, described, and pointed out novel features of the invention as applied to various embodiments, it will be understood that various omissions, substitutions, and changes in the form and details of the device or process illustrated may be made by those skilled in the art without departing from the intent of the invention. The scope of the invention is indicated by the appended claims rather than by the foregoing description. All changes that come within the meaning and range of equivalency of the claims are to be embraced within their scope.

What is claimed is:

1. A method of determining an optimized resource interconnection pattern within an essentially digital device, the method comprising:

determining an optimized labeling of a transfer conflict graph that is determined at least in part from a plurality of scheduling intervals, wherein the transfer conflict graph comprises transfer nodes representing transfers and further comprises transfer edge representing a conflict between the transfers, wherein the transfer are designated to be in conflict when the transfers have partially overlapping scheduling intervals, and determining the optimized labeling of the transfer conflict graph comprises labeling an endpoint of each edge such that each edge endpoint has a different label, while using a minimum amount of labels; and selecting an optimized interconnection pattern that satisfies at least the constraints determined by the optimized labeling of the transfer conflict graph.

2. The method of claim 1, wherein the essentially digital device comprises a plurality of resources and is represented by a representation describing the functionality of the essentially digital device, the representation comprising transfers and the scheduling intervals for the transfers, the transfers being defined by a source resource and a destination resource that are selected from the plurality of resources.

3. The method of claim 2, wherein the plurality of resources comprises a plurality of memory devices.

4. The method of claim 2, wherein determining the optimized labeling of the transfer conflict graph comprises labeling each endpoint such that each edge endpoint has a different label when the transfer nodes connected by the edge represent transfers involves the same resources.

5. The method of claim 2, further comprising:
defining buses for connecting the resources, wherein at least a part of the source and destination resources have a plurality of ports;
determining the optimized labeling of an access conflict graph, wherein accesses are defined by the transfers, and wherein the access conflict graph is determined from the scheduling intervals; and
selecting an optimized bus port assignment satisfying at least the constraints determined by the optimized access conflict graph labeling.

6. The method of claim 1, wherein selecting an optimized interconnection pattern comprises:
defining a plurality of buses; and
associating with each of the buses a source resource and a destination resource that are selected from the plurality of resources.

7. The method of claim 6, wherein at least one of the buses facilitates two transfers having non-overlapping transfer scheduling intervals.

8. The method of claim 6, wherein at least one bus facilitates two transfers having non-overlapping transfer scheduling intervals or temporarily facilitates two transfers having partially overlapping scheduling intervals.

9. The method of claim 6, wherein the source and destination resources are uniquely placed in hierarchy layer sets, wherein the transfer nodes are located within hierarchy transfer sets, wherein boundaries between the hierarchy layer sets define the hierarchy transfer sets, wherein the transfer nodes belong to a hierarchy transfer set when the related transfers proceed from a resource in one hierarchy layer set to the resource in another hierarchy layer set, wherein the hierarchy transfer sets are ordered, and wherein determining the optimized labeling of the transfer conflict graph comprises:
labeling hierarchy transfer set per hierarchy transfer set; and
starting with the first ordered hierarchy transfer set, such that each edge endpoint within a single one of the hierarchy transfer sets has a different label while using a minimal amount of labels.

10. The method of claim 9, wherein the labels of edges connecting transfer nodes within the single one of the hierarchy transfer sets identify at least one of the buses, and wherein the appearance of the same label on edges connecting transfer nodes within different single hierarchy transfer sets identifies a switch within the bus.

11. The method of claim 1, wherein endpoint labels identify at least one of the buses.

12. An essentially digital device comprising:
a plurality of resources; and
an optimized interconnection pattern between the resources, the optimized interconnection pattern comprising a plurality of buses, each of the buses interconnecting a portion of the resources;
wherein the essentially digital device is represented by a representation describing the functionality of the essentially digital device, the representation comprising:
a plurality of transfers that are defined by a source resource and a destination resource that are selected from the plurality of resources; and
a plurality of scheduling intervals for the transfers; and
wherein the essentially digital device is represented by the optimized interconnection pattern such that at least one bus facilitates a plurality of transfers with non-overlapping transfer scheduling intervals, and wherein the optimized interconnection pattern satisfies at least the constraints determined by an optimized labeling of a transfer conflict graph comprising transfer nodes representing transfers and further comprising conflicting transfer edges representing a conflict between the transfers, wherein the transfer conflict graph is determined at least in part from the scheduling intervals, and wherein determining the optimized labeling of the transfer conflict graph comprises labeling an endpoint of each edge such that each edge endpoint has a different label, while using a minimum amount of labels.

13. The method of claim 12, wherein the plurality of resources comprises a plurality of memory devices.

14. The essentially digital device of claim 12, wherein the number of buses is at most equal to the number of edges of a hyper-edge having the most edges found in the transfer conflict graph, and wherein the edges represent a conflict between the transfers having partially overlapping scheduling intervals.

15. The essentially digital device of claim 14, wherein the resources are placed in hierarchy layer sets, wherein the transfer nodes are located within hierarchy transfer sets, wherein boundaries between the hierarchy layer sets define the hierarchy transfer sets, wherein the transfer nodes belong to a hierarchy transfer set when the related transfers proceed from a resource in one hierarchy layer set to a resource in another hierarchy layer set, the number of buses being at most equal to the number of edges, wherein connecting transfer nodes within a single hierarchy transfer set of the hyper-edge having the most edges found in the transfer conflict graph, wherein edges represent a conflict between the transfers, and wherein the transfers have partially overlapping scheduling intervals.

16. The essentially digital device of claim 15, wherein the labels of edges connecting transfer nodes within a single one of the hierarchy transfer sets identify at least one of the buses, and wherein the appearance of the same label on edges connecting transfer nodes within a different single one of the hierarchy transfer sets identifies a switch within the bus.

17. An essentially digital device comprising:
a plurality of resources; and
an optimized interconnection pattern between the resources, the optimized interconnection pattern comprising a plurality of buses, each of the buses interconnecting at least a portion of the resources;
wherein the essentially digital device is represented by a representation describing the functionality of the digital device, the representation comprising:
a plurality of transfers defined by a source resource and a destination resource that are selected from the plurality of resources; and
a plurality of scheduling intervals for the transfers; and
wherein the digital device is represented by the optimized interconnection pattern such that at least one of the buses facilitates a plurality of transfers with non-overlapping transfer scheduling intervals or temporarily facilitates a plurality of transfers with partially overlapping scheduling intervals, and wherein the optimized interconnection pattern satisfies at least the constraints depicted by an optimized labeling of a transfer conflict graph, wherein the transfer conflict graph is determined from at least the scheduling intervals, wherein said transfer conflict graph comprises transfer nodes representing transfers and further comprises conflicting transfer edges representing a conflict between the transfers, and wherein determining the optimized labeling of the transfer conflict graph comprises labeling an endpoint of each edge such that each edge endpoint has a different label, while using a minimum amount of labels.

18. The method of claim 17, wherein the plurality of resources comprises a plurality of memory devices.

19. The essentially digital device of claim 17, wherein the number of buses is at most equal to the number of edges of a hyper-edge having most edges found in the transfer conflict graph comprising transfer nodes representing transfers, and wherein the edges represent a conflict between the transfers having partially overlapping scheduling intervals.

20. The essentially digital device of claim 19, wherein the resources are placed in hierarchy layer sets, wherein the transfer nodes are located within hierarchy transfer sets, wherein boundaries between the hierarchy layer sets define the hierarchy transfer sets, wherein the transfer nodes belong to a hierarchy transfer set when the related transfers proceed from a resource in one hierarchy layer set to a resource in another hierarchy layer set the number of buses being at most equal to the number of edges, wherein connecting transfer nodes within a single hierarchy transfer set of the hyper-edge having most edges found in the transfer conflict graph comprising transfer nodes representing transfers, and wherein edges represent a conflict between the transfers, wherein the transfers have partially overlapping scheduling intervals.

21. The essentially digital device of claim 20, wherein the labels of edges connecting transfer nodes within a single one of the hierarchy transfer sets identify at least one of the buses, and wherein the appearance of the same label on edges connecting transfer nodes within a different single one of the hierarchy transfer sets identifies a switch within the bus.

22. A method of manufacturing an essentially digital device, the method comprising:
  determining at least from a plurality of scheduling intervals an optimized labeling of a transfer conflict graph, wherein the transfer conflict graph comprises transfer nodes representing transfers and further comprises conflicting transfer edges representing a conflict between the transfers, and wherein determining the optimized labeling of the transfer conflict graph comprises labeling an endpoint of each edge such that each edge endpoint has a different label, while using a minimum amount of labels; and
  selecting an optimized interconnection pattern that satisfies at least the constraints determined by the optimized labeling of the transfer conflict graph.

23. The method of claim 22, wherein the essentially digital device comprises a plurality of resources and is represented by a representation describing the functionality of the essentially digital device, the representation comprising a plurality of transfers and a plurality of scheduling intervals for the transfers.

24. The method of claim 23, wherein selecting the optimized interconnection pattern comprises:
  defining a plurality of buses; and
  associating with each of the buses a source resource and a destination resource that are selected from the plurality of resources.

25. The method of claim 24, wherein at least one of the buses facilitates two transfers having non-overlapping transfer scheduling intervals.

26. The method of claim 24, wherein at least one of the buses facilitates two transfers having non-overlapping transfer scheduling intervals or temporarily facilitates two transfers having partially overlapping scheduling intervals.

27. A design system for designing an essentially digital device, the system comprising:
  means for generating a representation describing the functionality of the essentially digital device, the representation comprising transfers and scheduling intervals for the transfers;
  means for determining an optimized labeling of a transfer conflict graph that is determined from the scheduling intervals, the determining comprising uniquely labeling endpoints of transfer edges; and
  means for selecting an optimized interconnection pattern that satisfies at least the constraints depicted by the optimized labeling of the transfer conflict graph.

28. A method of determining an optimized resource interconnection pattern within an essentially digital device, the method comprising:
  determining a transfer conflict graph, wherein the transfer conflict graph comprises transfer nodes representing transfers and further comprises conflicting transfer edges representing a conflict between the transfers;
  determining an optimized labeling of the transfer conflict graph that is determined at least in part from a plurality of scheduling intervals, wherein determining the optimized labeling of the transfer conflict graph comprises labeling an endpoint of each edge such that each edge endpoint has a different label, while using a minimum amount of labels;
  selecting an optimized interconnection pattern for at least one of a plurality of partial digital devices that satisfies at least the constraints determined by the optimized labeling of the transfer conflict graph;
  determining at least one bus for interconnection of the plurality of partial digital devices;
  determining an access conflict graph representing the interconnection of the plurality of partial digital devices;
  determining an optimized labeling of the access conflict graph that is determined at least in part from a plurality of conflicts between accesses to a plurality of resources for the plurality of partial digital devices; and
selecting an optimized interconnection pattern for the plurality of partial digital devices that satisfies at least the constraints determined by the optimized labeling of the access conflict graph.

* * * * *

UNITED STATES PATENT AND TRADEMARK OFFICE
CERTIFICATE OF CORRECTION

PATENT NO. : 6,889,275 B2
APPLICATION NO. : 10/128629
DATED : May 3, 2005
INVENTOR(S) : Vandecappelle et al.

It is certified that error appears in the above-identified patent and that said Letters Patent is hereby corrected as shown below:

In column 4, line 43, after "devices" insert -- . --.

In column 7, line 36, delete "VX Works," and insert -- Vx Words, --, therefor.

In column 9, line 39, delete "e.g.," and insert -- (e.g., --, therefor.

In column 21, line 45, after "switches" insert -- . --.

In column 25, line 44, delete "BH;" and insert -- BH. --, therefor.

In column 27, line 27, delete "a" and insert -- an --, therefor.

In column 27, line 28, after "matches" delete "a" and insert -- an --, therefor.

In column 27, line 28, after "and" delete "a" and insert -- an --, therefor.

In column 27, line 29, after "and" delete "a" and insert -- an --, therefor.

In column 29, line 17, delete "MACG'S," and insert -- MACG's, --, therefor.

In column 32, line 45, in Claim 1, delete "edge" and insert -- edges --, therefor.

In column 32, line 46, in Claim 1, delete "transfer" and insert -- transfers --, therefor.

In column 32, line 48, in Claim 1, after "and" insert -- wherein --.

Signed and Sealed this

First Day of May, 2007

JON W. DUDAS
*Director of the United States Patent and Trademark Office*